(12) United States Patent
Lundvall et al.

(10) Patent No.: US 12,337,610 B2
(45) Date of Patent: Jun. 24, 2025

(54) MANUFACTURING OF SYNTHETIC IMAGES WITH CONTINUOUS ANIMATION

(71) Applicant: ROLLING OPTICS INNOVATION AB, Solna (SE)

(72) Inventors: Axel Lundvall, Bjursås (SE); Daniel Parrat, Uppsala (SE)

(73) Assignee: ROLLING OPTICS INNOVATION AB, Solna (SE)

( * ) Notice: Subject to any disclaimer, the term of this patent is extended or adjusted under 35 U.S.C. 154(b) by 254 days.

(21) Appl. No.: 18/266,413

(22) PCT Filed: Dec. 10, 2021

(86) PCT No.: PCT/SE2021/051228
§ 371 (c)(1),
(2) Date: Jun. 9, 2023

(87) PCT Pub. No.: WO2022/124975
PCT Pub. Date: Jun. 16, 2022

(65) Prior Publication Data
US 2024/0051328 A1    Feb. 15, 2024

(30) Foreign Application Priority Data
Dec. 11, 2020    (SE) .................................... 2051448-5

(51) Int. Cl.
*B42D 25/425*    (2014.01)
*B42D 25/324*    (2014.01)
(Continued)

(52) U.S. Cl.
CPC ......... *B42D 25/425* (2014.10); *G02B 3/0056* (2013.01); *G02B 27/06* (2013.01);
(Continued)

(58) Field of Classification Search
CPC .. B42D 25/425; B42D 25/324; B42D 25/342; G02B 3/0056; G02B 27/06; G09F 19/14
See application file for complete search history.

(56) References Cited

U.S. PATENT DOCUMENTS

| | | |
|---|---|---|
| 7,738,175 B2 | 6/2010 | Steenblik et al. |
| 8,739,711 B2 | 6/2014 | Cote |

(Continued)

FOREIGN PATENT DOCUMENTS

| | | |
|---|---|---|
| AU | 2013204845 A1 | 5/2013 |
| WO | WO 94/27254 A1 | 11/1994 |

(Continued)

OTHER PUBLICATIONS

International Preliminary Report on Patentability, issued in PCT/SE2021/051228, dated Nov. 7, 2022.
(Continued)

*Primary Examiner* — King Y Poon
*Assistant Examiner* — Vincent Alexander Providence
(74) *Attorney, Agent, or Firm* — Birch, Stewart, Kolasch & Birch, LLP

(57) ABSTRACT

A method for manufacturing a synthetic image device includes providing of a focusing element array. An image layer is arranged in a vicinity of a focal distance of focusing elements of the focusing element array, whereby a synthetic image composed of enlarged portions of the image layer becomes perceivable for a viewer. The image layer includes an array of image cells, each being associated with a respective focusing element and wherein the array of image cells has a same symmetry and element distance as the focusing element array. The arranging includes creating continuous image objects within the image cells such that synthetic images to be viewed, all having contributions from one of the continuous image objects, present smooth suc-
(Continued)

cessive non-parallax alterations upon changing a viewing direction. This creation is performed according to an array of digital image cells of a digital image layer model.

20 Claims, 21 Drawing Sheets

(51) Int. Cl.
  *B42D 25/342* (2014.01)
  *G02B 3/00* (2006.01)
  *G02B 27/06* (2006.01)
  *G09F 19/14* (2006.01)
(52) U.S. Cl.
  CPC ............ *G09F 19/14* (2013.01); *B42D 25/324* (2014.10); *B42D 25/342* (2014.10)

(56) References Cited

U.S. PATENT DOCUMENTS

| | | | |
|---|---|---|---|
| 2008/0037131 A1* | 2/2008 | Steenblik | B42D 25/378 359/619 |
| 2011/0036282 A1* | 2/2011 | Cote | G02B 27/022 112/402 |
| 2016/0176221 A1* | 6/2016 | Holmes | B42D 25/328 283/77 |
| 2017/0336644 A1 | 11/2017 | Lundvall et al. | |
| 2019/0219832 A1 | 7/2019 | Yang et al. | |

FOREIGN PATENT DOCUMENTS

| | | |
|---|---|---|
| WO | WO 2008/008635 A2 | 1/2008 |
| WO | WO 2015/034551 A1 | 3/2015 |
| WO | WO 2018/101881 A1 | 6/2018 |

OTHER PUBLICATIONS

International Search Report, issued in PCT/SE2021/051228, dated Feb. 10, 2022.

Written Opinion of the International Searching Authority, issued in PCT/SE2021/051228, dated Feb. 10, 2022.

* cited by examiner

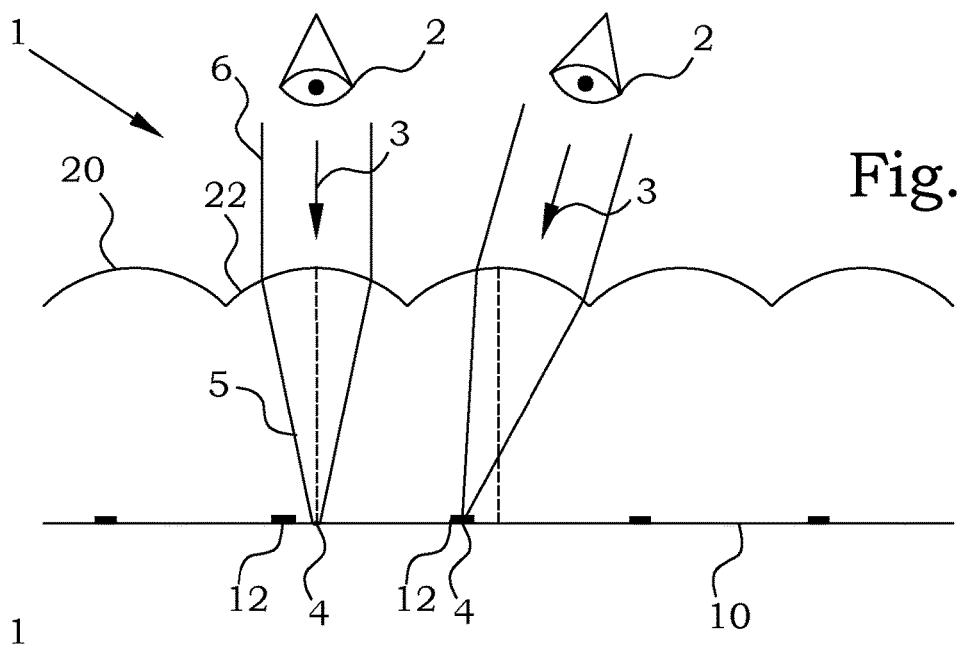
Fig. 2
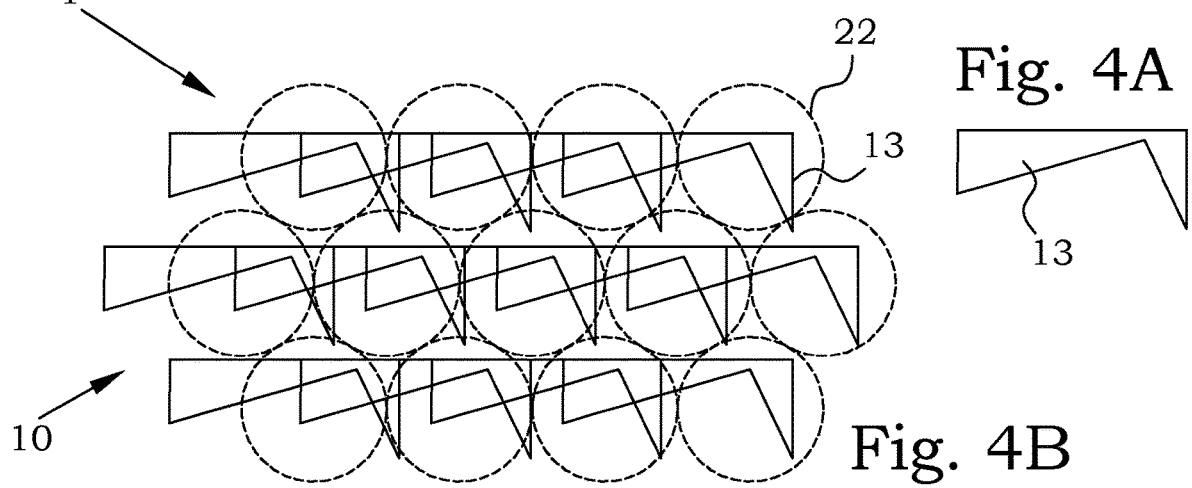
Fig. 4A
Fig. 4B
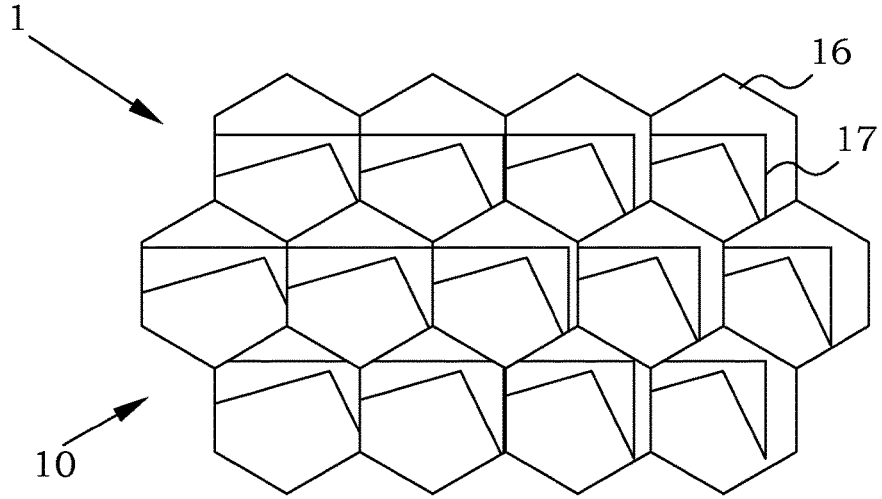
Fig. 4C

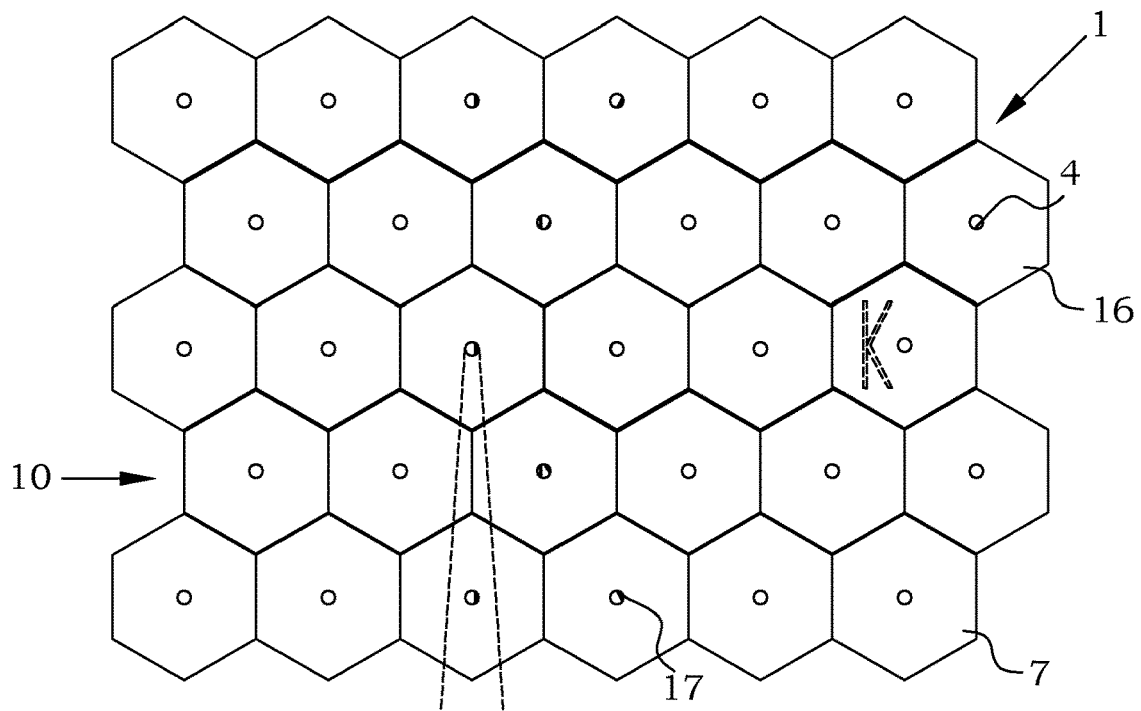
Fig. 7A
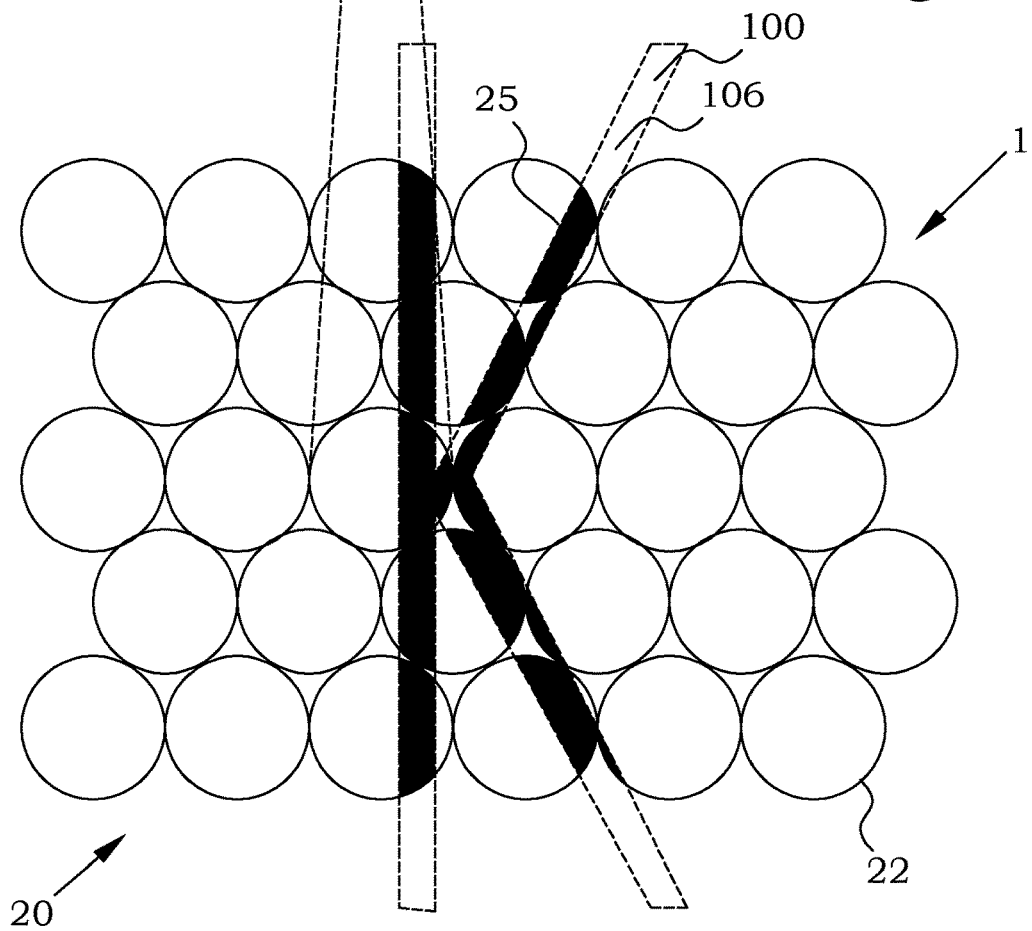

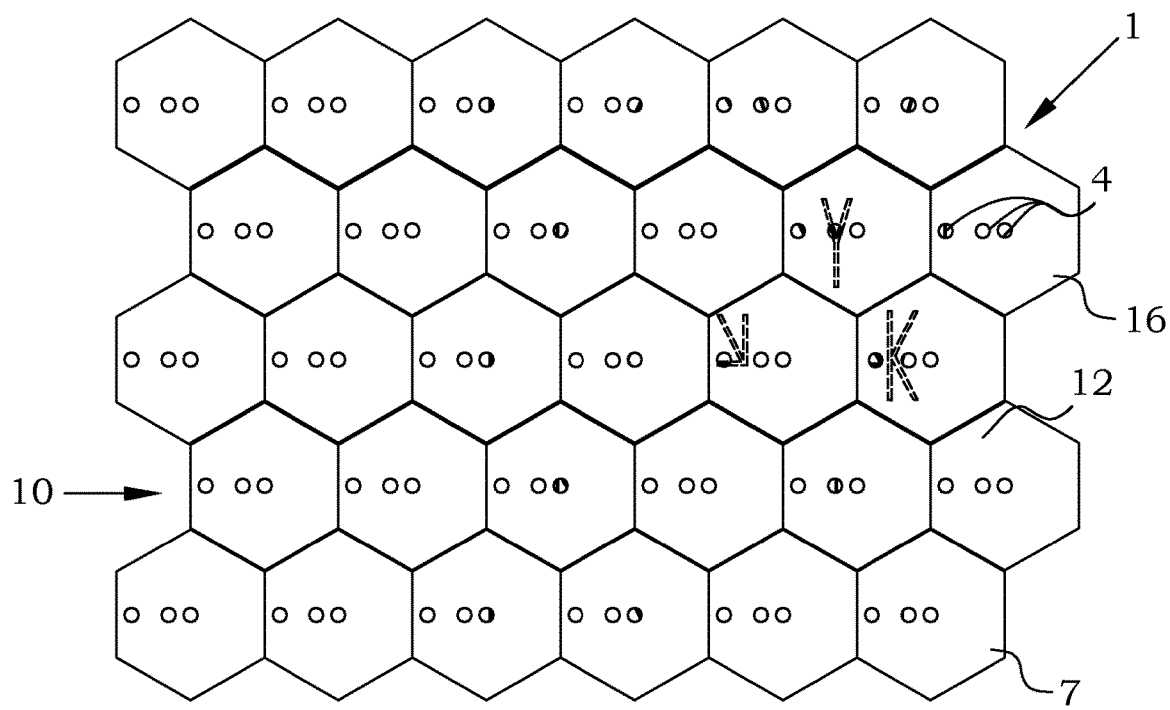
Fig. 7D
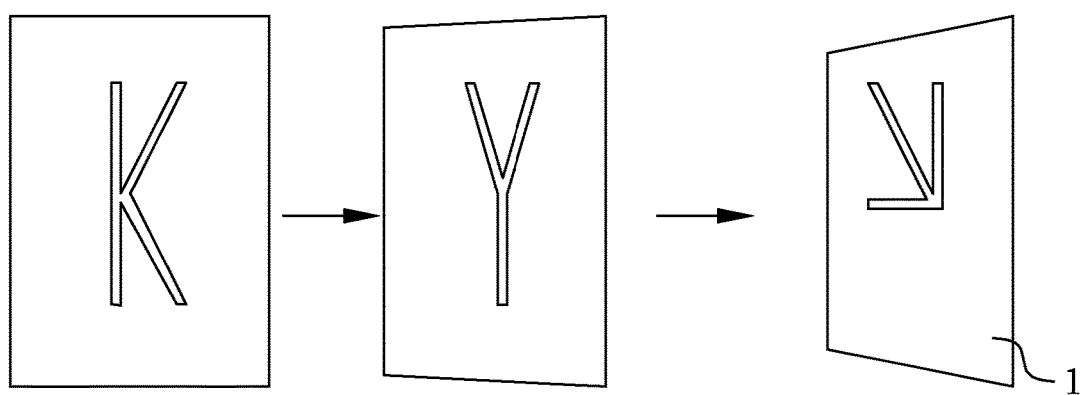

MANUFACTURING OF SYNTHETIC IMAGES WITH CONTINUOUS ANIMATION

TECHNICAL FIELD

The present invention relates in general to optical devices and manufacturing processes therefore, and in particular to manufacturing of synthetic-image devices.

BACKGROUND

Synthetic-image devices are today often used for creating eye-catching visual effects for many different purposes. Examples of use are e.g. as security documents, security markings, tamper indications or simply as aesthetic images. Usually, the synthetic-image device is intended to be provided as a label or as an integrated part in another device. Many different optical effects have been discovered and used and often different optical effects are combined to give a certain requested visual appearance.

A typical synthetic-image device presents an array of small focusing elements and image objects created in different planes of a thin foil. The focusing element may be different kinds of lenses, apertures or reflectors. An image layer is provided with image objects. The image layer is provided relative to the array of focusing elements such that when the device is viewed from different angles, different parts of the image objects are enlarged by the focusing elements and together form an integral image. Depending on the design of the image objects, the synthetic image can change in different ways when the viewing conditions, e.g. viewing angles, are changed. A typical realization of the synthetic-image device is a thin polymer foil.

The actual perception of the synthetic image is performed by the user's eyes and brain. The ability of the human brain to create an understandable totality from fragmented part images can be used for creating "surprising effect". Such eye-catching effects are popular to be utilized for security and/or authentication purposes.

One often used simple type of "surprising effect" is the provision of a depth perception. Since a synthetic-image device typically is a thin flat device, a synthetic image that behaves as if it was positioned above or below the surface of the synthetic-image device, causes a "strange" experience. The synthetic image appears to float above the surface or appears to be present below the surface. Such an effect is supported by providing a synthetic image that changes according to parallax properties of an image being present above or below the surface. This effect becomes particularly spectacular if the image is a true 3D image, i.e. when the showed object itself has an extension in the depth direction.

Another, often used, surprising effect is to change from one synthetic image to another synthetic image upon tilting the synthetic-image device, i.e. by changing the viewing direction. Such abrupt change of the synthetic image does not follow what is experienced if a real object would have been viewed, and a surprising effect is thus present. This is e.g. illustrated in the published international patent application WO 94/27254 A1, where FIGS. 2A and 2B shows the provision of different images in different directions.

Even more eye-catching effects may be a gradual change of a synthetic image. This can typically be realized by providing a series of "abrupt" changes, but where the differences between each different synthetic image is relatively small. This gives rise to a step-wise animation using synthetic images. Different approaches have been presented.

In the published U.S. Pat. No. 8,739,711 B2, a micro-optic security device is presented, employing planar arrangements of stitched icons and projecting a synthetically magnified image. The synthetically magnified images constitute images that optionally changes to a different image as the security device is tilted, giving different viewing angles. An image layer comprises slices from one or more icon designs, where each slice is spaced apart from, abuts, or slightly overlaps an adjacent slice.

Each slice thus represents a different image. By providing icon designs of successively changing images, and upon tilting, a series of step-wise changing images may be provided. The "smoothness" of such a step-wise change of images depends mainly on the number of successively changing images, which is dependent on the size of the used slices of icon designs. More slices with less changes in the associated images will increase the smoothness. Eventually, the available geometrical resolution of the provided icons puts a limit to this smoothening.

Also, in the published International patent application WO 2018/101881 A1, synthetic-image devices with morphing or animating properties are disclosed, e.g. in connection with FIGS. 27A-D, 28 and 29A-B and pages 40-43. In some embodiments, image cells of the synthetic-image device are divided into channels, which comprises image objects used for creating respective synthetic images. By providing synthetic images in these channels gradually changing their appearance, a step-wise morphing or animation is obtained. Also here, the size of the channels and the differences between neighbouring synthetic images decides the smoothness. Due to physical limitations, the channels and the geometrical structures within the channels cannot be produced properly.

Still, the impression of the animation obtained by this approach is a jerky behaviour of the image.

SUMMARY

A general object is thus to improve the perceived quality of synthetic image animations.

The above object is achieved by methods and devices according to the independent claims. Preferred embodiments are defined in dependent claims.

In general words, in a first aspect, a method for manufacturing a synthetic image device comprises providing of a focusing element array. An image layer is arranged in a vicinity of a focal distance of focusing elements of the focusing element array, whereby a synthetic image composed of enlarged portions of the image layer becomes perceivable for a viewer. The image layer comprises an array of image cells, wherein each image cell is associated with a respective focusing element of the focusing element array and wherein the array of image cells has a same symmetry and element distance as the focusing element array. An image point at each position within an image cell cooperates with image points at corresponding positions within other image cells to give rise to a synthetic image in an associated viewing direction. The arranging comprises creation of continuous image objects within the image cells such that synthetic images to be viewed, all having contributions from one of the continuous image objects in at least one of the image cells, present smooth successive non-parallax alterations upon changing a viewing direction. The creation of continuous image objects is performed according to an array of digital image cells of a digital image layer model, wherein each digital image cell comprises a digital representation of a shape of the digital image cell and digital descriptions of digital image objects within respective digital image cell.

One advantage with the proposed technology is that a synthetic image animation of an improved smoothness is provided. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 2 is a schematic drawing illustrating viewing from different angles;

FIGS. 4A-C illustrate the ideas of forming an example of an integral synthetic-image device;

FIG. 7A-D illustrate schematically the creation of an animated synthetic image;

DETAILED DESCRIPTION

Throughout the drawings, the same reference numbers are used for similar or corresponding elements.

For a better understanding of the proposed technology, it may be useful to begin with a brief overview of synthetic-image devices. This initial overview is provided for the purpose of understanding the basic properties of synthetic images. However, the simplest types of synthetic images mentioned here, e.g. pure moiré images, cannot be used for the purpose of the present invention.

Figure 1A:
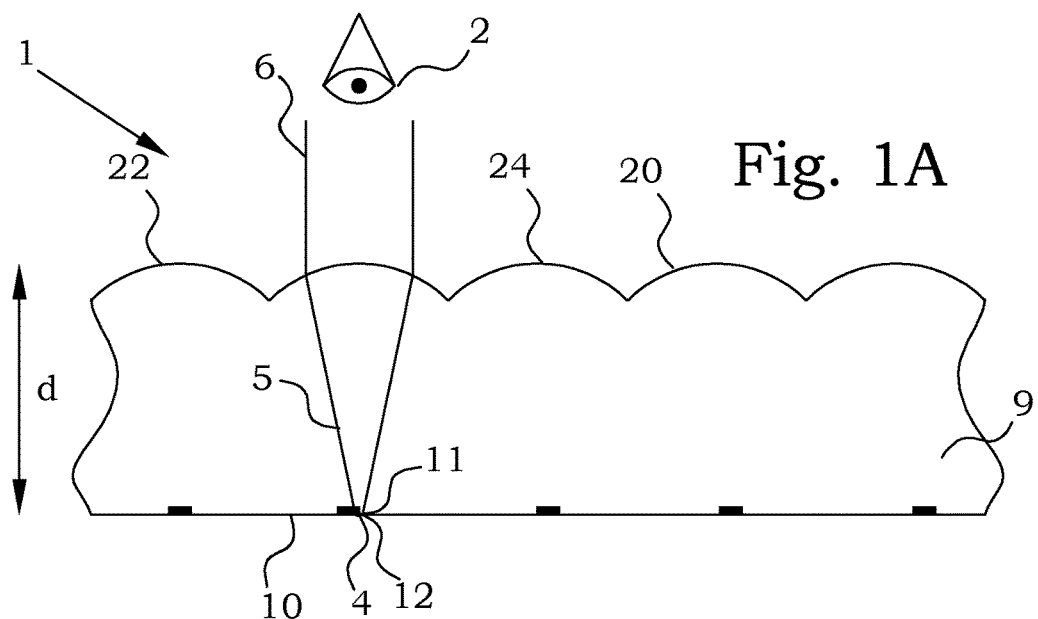
FIGS. 1A-C are schematic drawings of synthetic-image devices utilizing different focusing elements.

FIG. 1A schematically illustrates one example of a synthetic-image device 1. The synthetic-image device 1 comprises a focusing element array 20 of focusing elements 22. In this example, the focusing element is a lens 24. In a typical case, where the synthetic image is intended to be essentially the same in different surface directions, the lens 24 is typically a spherical lens. In applications, where a difference between image properties in different surface directions, lenticular lenses may be used. Also other types of lenses, such as polygonal lenses, zone plate lenses etc. may advantageously be utilized, depending on the application.

The synthetic-image device 1 further comprises an image layer 10 comprising image objects 12. The image objects 12 are objects that are optically distinguishable from parts 14 of the image layer 10 that are not covered by image objects 12. The image objects 12 may e.g. be constituted by printed product micro features 11 and/or embossed microstructures. The image layer is arranged in a vicinity of a focal distance d of the focusing elements 22 of the focusing element array 20. This means that a parallel beam 6 of light impinging on a focusing element 22 will be refracted 5 and focused at one small area, here denoted as an image point 4, at the image layer 10. Likewise, light emanating from one image point 4 at the image layer 10 will give rise to a parallel beam 6 of light when passing the focusing elements 22. An image point 4 at an image object 12 will therefore appear to fill the entire surface of the focusing element 22 when viewed from a distance in the direction of the produced parallel beam 6 by a viewer, schematically illustrated by the eye of the viewer 2. The material 9 between the image layer 10 and the focusing element array 20 is at least partly transparent and is typically constituted by a thin polymer foil.

The distance d does not have to be exactly equal to the focusing distance of the focusing elements 22. First, there is always a certain degree of aberrations, which anyway broadens the area from which the optical information in a parallel beam 6 is collected. This appears more at shallower angles and in order to have a more even general resolution level, a distance in a vicinity, but not exactly equal to the focal distance may be beneficially selected. Furthermore, since the focusing element surface has a certain two-dimensional extension, also this surface could be used to produce fine objects of the total synthetic image. In such cases, fine objects of a small area on the image layer 10 may be beneficial to enlarge to cover the surface of the focusing element, which means that also in such a case, the actual selected distance d is selected to be in a vicinity, but not exactly equal to the focal distance. Such circumstances are well known in the art of synthetic images.

By arranging the image objects 12 of the image layer 10 in a suitable manner, the part images produced at each individual focusing element 22 surface will collectively be perceived by a viewer 2 as a synthetic image. Different images may be displayed for the viewer when the synthetic-image device 1 is viewed in different directions, which opens up for creating different kinds of optical effects, as will be described further below.

Figure 1B:
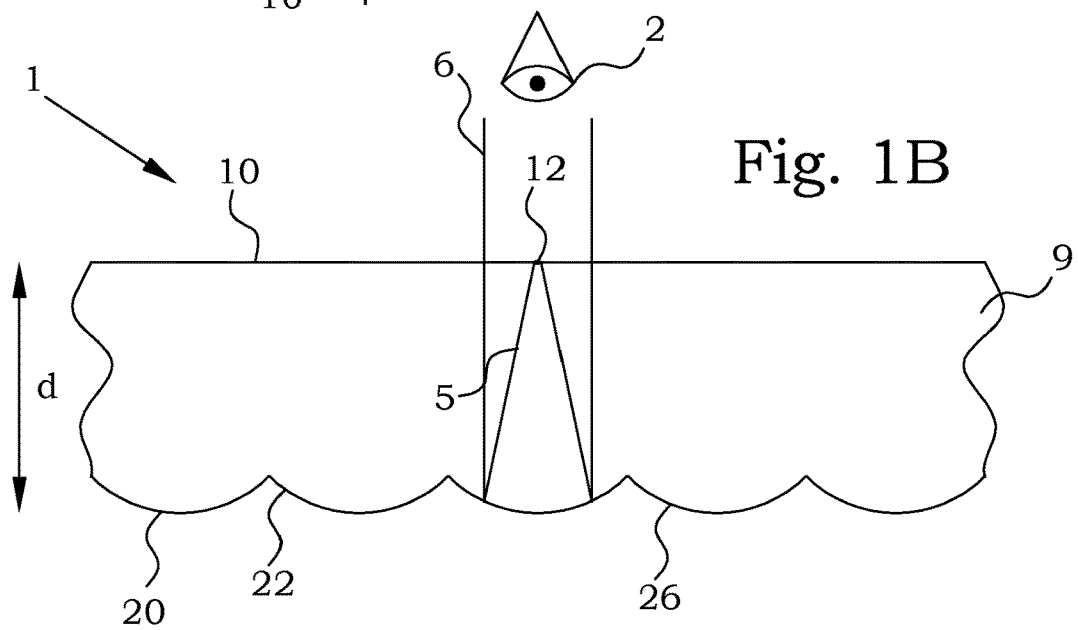

FIG. 1B schematically illustrates another example of a synthetic-image device 1. In this example, the focusing elements 22 are constituted by concave mirrors 26. The image layer 10 is here situated on the front surface with reference to the viewer 2 and the focusing element array 20 is situated behind the image layer 10. The rays 5 of light travelling from the image objects to the viewer 2 pass the material 9 of the synthetic-image device twice.

Figure 1C:
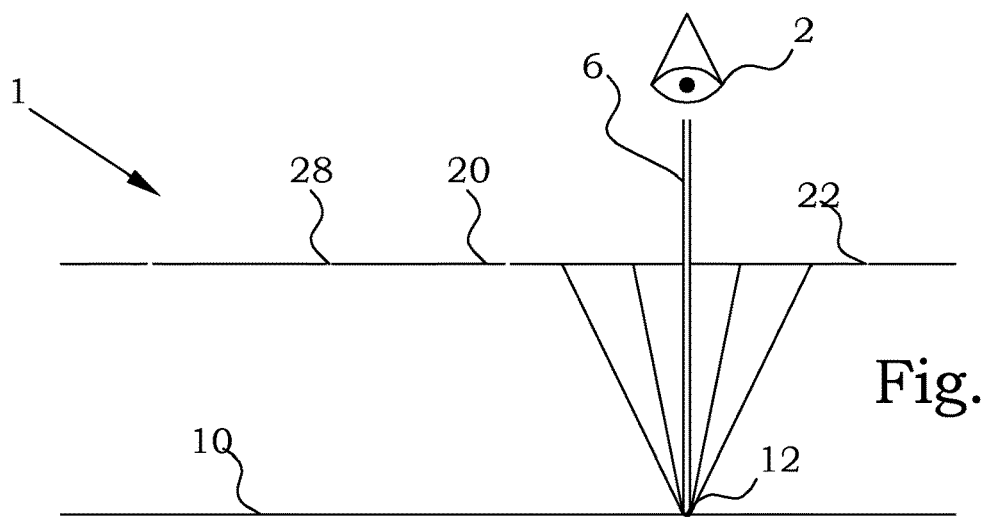

FIG. 1C schematically illustrates yet another example of a synthetic-image device 1. In this example, the focusing elements are pinholes 28, restricting the light coming from the image layer 10 and passing through to the viewer 2. In this example, the synthetic image is built by the narrow light beams passing the pinholes 28, and are typically only providing "light" or "dark". Since the pinholes 28 doesn't have any enlarging effect, most of the viewed surface does not contribute to the synthetic image.

FIG. 2 illustrates schematically the selection of different part areas or image points 4 of the image layer 10. The image layer 10 comprises image objects 12. When the synthetic-image device 1 is viewed in a viewing direction 3, which as illustrated in the left part of the drawings is perpendicular with reference to the main surface of the synthetic-image device 1, the image point 4 that is enlarged by the focusing element 22 is situated at the centre line, illustrated in the figure by a dotted line, of the focusing element 22. If an image object 12 is present at that position, an enlarged version is presented at the surface of the synthetic-image device 1. However, as in the case of FIG. 2, no image object is present, and there will be no enlarged image at the surface of the synthetic-image device 1.

When viewing the synthetic-image device 1 at another angle, as e.g. illustrated in the right part of the figure, the image point 4 on which the focusing element 22 focuses is shifted at the side. In the illustrated situation, the image point 4 overlaps with at least a part of an image object 12 and an enlarged version can be seen at the surface of the synthetic-image device 1. In this way, the images presented at the surface of the synthetic-image device 1 may change for different viewing angles, which can be used for achieving different kinds of optical effects of the synthetic images. There is thus an association between the position of the image point 4 and a viewing direction 3 in which the image point 4 contributes to the synthetic image.

Figure 3A:
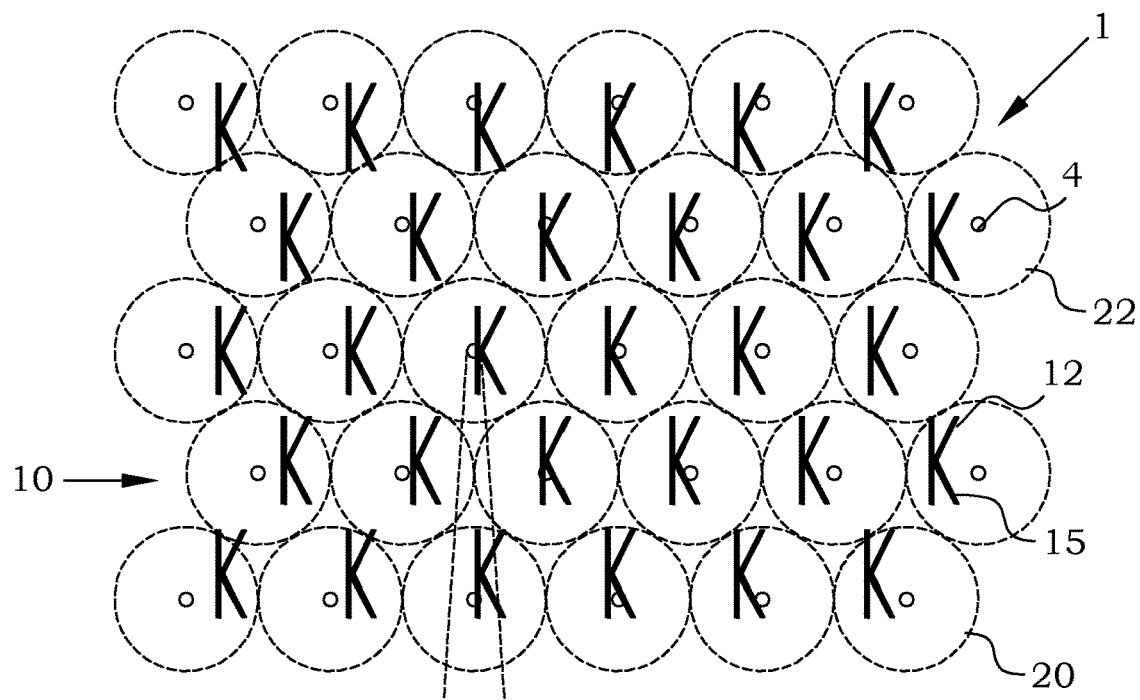
FIGS. 3A-B illustrate the formation of a synthetic image for two different viewing angles.
Figure 3A:
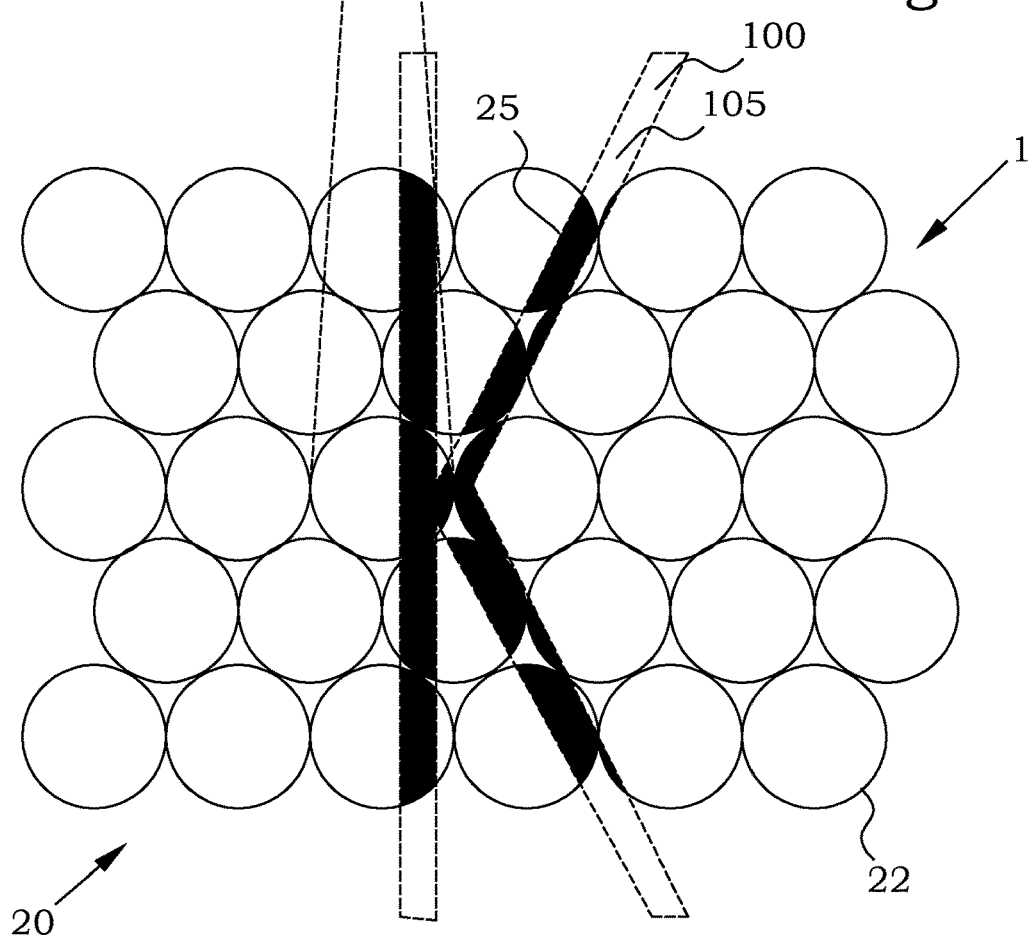

One type of synthetic image is a so-called moiré image. The moiré magnification effect is well known since many years and is based on the cooperation of two slightly mismatching arrays. These fundamental findings are disclosed e.g. in "The moiré magnifier" by M C Hutley et al, in Pure Appl. Opt. 3 (1994), pp. 133-142. FIG. 3A schematically illustrates in the upper part an example of a part of an image layer 10. The image layer 10 comprises a repetitive pattern 15 of image objects 12. In this example, the image objects 12 are selected to be the letter "K". Focusing elements 22 associated with the illustrated part of the image layer 10 are illustrated by dotted circles, to indicate the relative lateral position. Both the repetitive pattern 15 of image objects 12 and the focusing element array 20 have a hexagonal symmetry. However, the distance between two neighbouring image objects 12 is slightly shorter than the distance between two neighbouring focusing elements 22 in the same direction.

An image point 4 is also marked, which corresponds to the focusing area of each focusing element 22, when viewed in the associated viewing direction. In the illustrated case, the image point 4 corresponds to a view direction straight from the front. The parts of the image objects 12 that are present within each of the image points 4 will thereby be presented in an enlarged version over the surface of the corresponding focusing element 22, here denoted as a projected image 25. In the lower part of FIG. 3A, the corresponding focusing element array 20 is illustrated including the projected images 25 of the image objects 12 of the image points 4. The dotted lines from one of the image points 4 in the upper part to one of the focusing elements 22 in the lower part illustrates this association. The different projected images at the focusing elements 22 together forms a synthetic image 100. In this case, the synthetic image 100 is a part of a large "K". If these structures are small enough, the human eye will typically fill in the empty areas between the focusing elements 22 and the viewer will perceive a full "K". The reason for the K to be produced is the existence of the slight period mismatch between the repetitive pattern 15 of image objects 12 and the focusing element array 20. In this example, using the mismatch between a repetitive image pattern 15 and an array of focusing elements 22, the synthetic image 100 is called a moiré image 105.

Figure 3B:
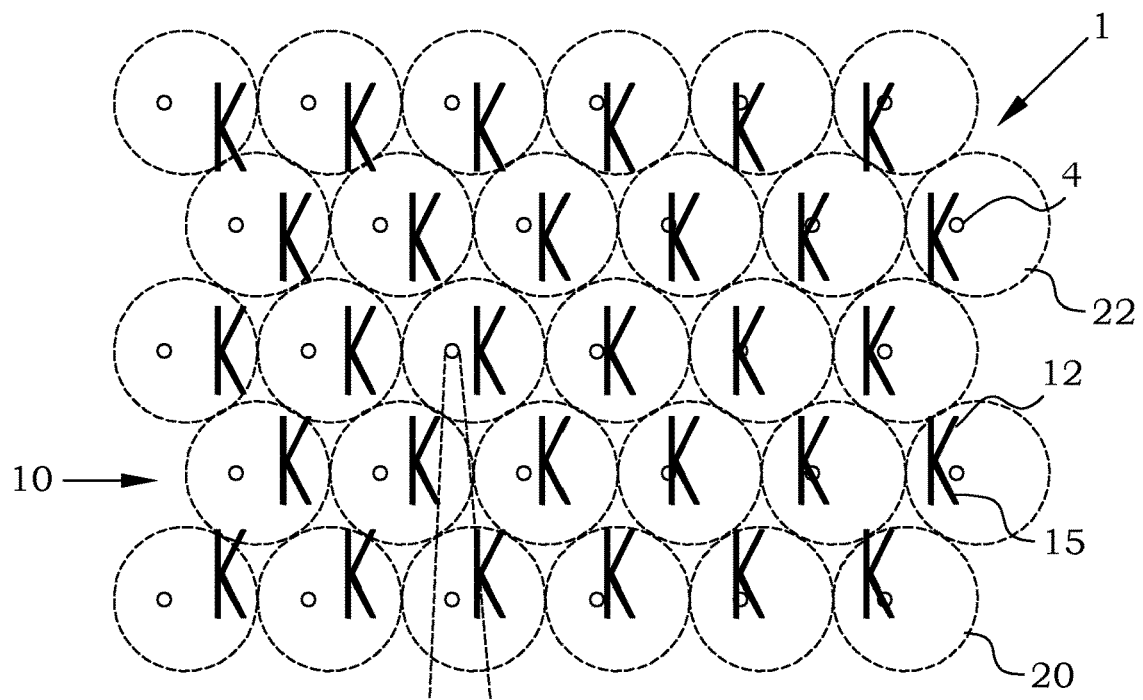
Figure 3B:
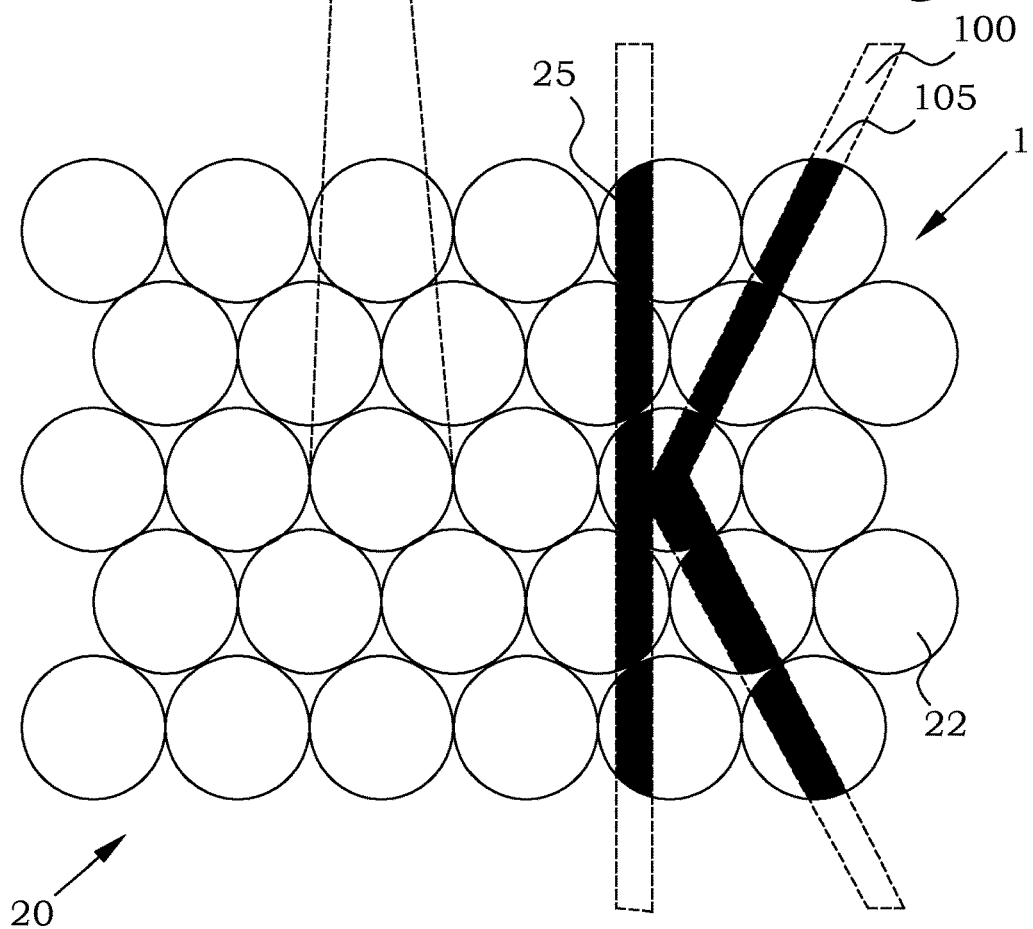

FIG. 3B schematically illustrates the same synthetic-image device 1 as in FIG. 3A, but when viewed in another viewing direction. This corresponds to a slight tilting of the synthetic-image device 1 to the left. The image points 4 which corresponds to the focusing areas of the focusing elements 22 in this direction are thereby moved somewhat to the left. This results in that another image point 4 of the image objects 12 are projected to the focusing elements 22, as seen in the lower part of the FIG. 3B. The result of the tilting is that the synthetic image 100, i.e. the large "K" moves to the right.

The viewer will interpret such a motion as a result of a position of the large "K" at a certain imaginary or apparent depth below the surface of the synthetic-image device 1. In other words, a depth feeling is achieved. Both the magnification and the experienced depth depends on the relation between the focusing element array 20 and the repetitive pattern 15 of image objects 12. It has in prior art been shown that the obtained magnification M is determined as:

$$M = \frac{1}{F - F^2}, \tag{1}$$

$$\text{where } F = \frac{P_o}{P_l},$$

where $P_o$ is the period of the repetitive pattern 15 of image objects 12 and $P_l$ is the period of the focusing element array 20. For $P_o < P_l$, the magnification is positive, for $P_o > P_l$, the magnification becomes negative, i.e. the synthetic image 100 becomes inverted compared to the image objects 12.

The apparent image depth $d_i$ of the moiré image when using spherical microlenses can also be determined as:

$$d_i = (d - R_l)/(1 - F) + R_l, \tag{2}$$

where d is the thickness of the synthetic-image device and $R_l$ is the radius of the curvature of the spherical microlenses. One can here notice that for $P_o < P_l$, the apparent depth is typically positive, while for $P_o > P_l$, the apparent depth becomes negative, i.e. the moiré image 105 seems to float above the surface of the synthetic-image device 1.

It should be noted that the differences in periods illustrated in FIGS. 3A and 3B are relatively large, which gives a relatively low magnification and a relatively small apparent depth. This is made for purposes of illustration. In typical moiré synthetic-image devices, the relative period differences may typically be much less. Period differences of less than 1% and even less than 0.1% are not uncommon.

The moiré images have, however, certain limitations. First, they can only result in repetitive images. Furthermore, the size of the image objects 12 is limited to the size of the focusing elements. In FIG. 4A, an image object 13 to be repeated is schematically illustrated. If this image object is repeated with almost the same period as for the focusing elements 22 of FIG. 4B, the repeated patterns of repetitive image objects 13 will overlap. The moiré image from such a structure will be almost impossible for the human brain to resolve, since parts of the image objects associated with a neighbouring focusing element 22 will interfere.

A solution is presented in FIG. 4C. Here an image cell 16 of the image layer 10 is exclusively associated with each focusing element 22. The image layer 10 thus comprises an array 7 of image cells 16, wherein each image cell 16 is associated with a respective focusing element of the focusing element array. Within each image cell 16, only parts of the original repetitive image object, belonging to one copy of the repetitive image object is preserved as a truncated image object 17 for that image cell 16 and the other interfering repetitive image objects are removed. The different truncated image objects 17 of the different image cells 16 will now not be identically repeated over the image layer 10, but instead the truncated image objects 17 are successively changing in shape. By using these cut-out parts or fractions as the truncated image object 17, a synthetic image will also be produced. A synthetic image based on non-identical fractioned image objects 17 within image cells 16 associated with the focusing elements 22 is in this disclosure referred to as an integral synthetic image.

Figure 5:
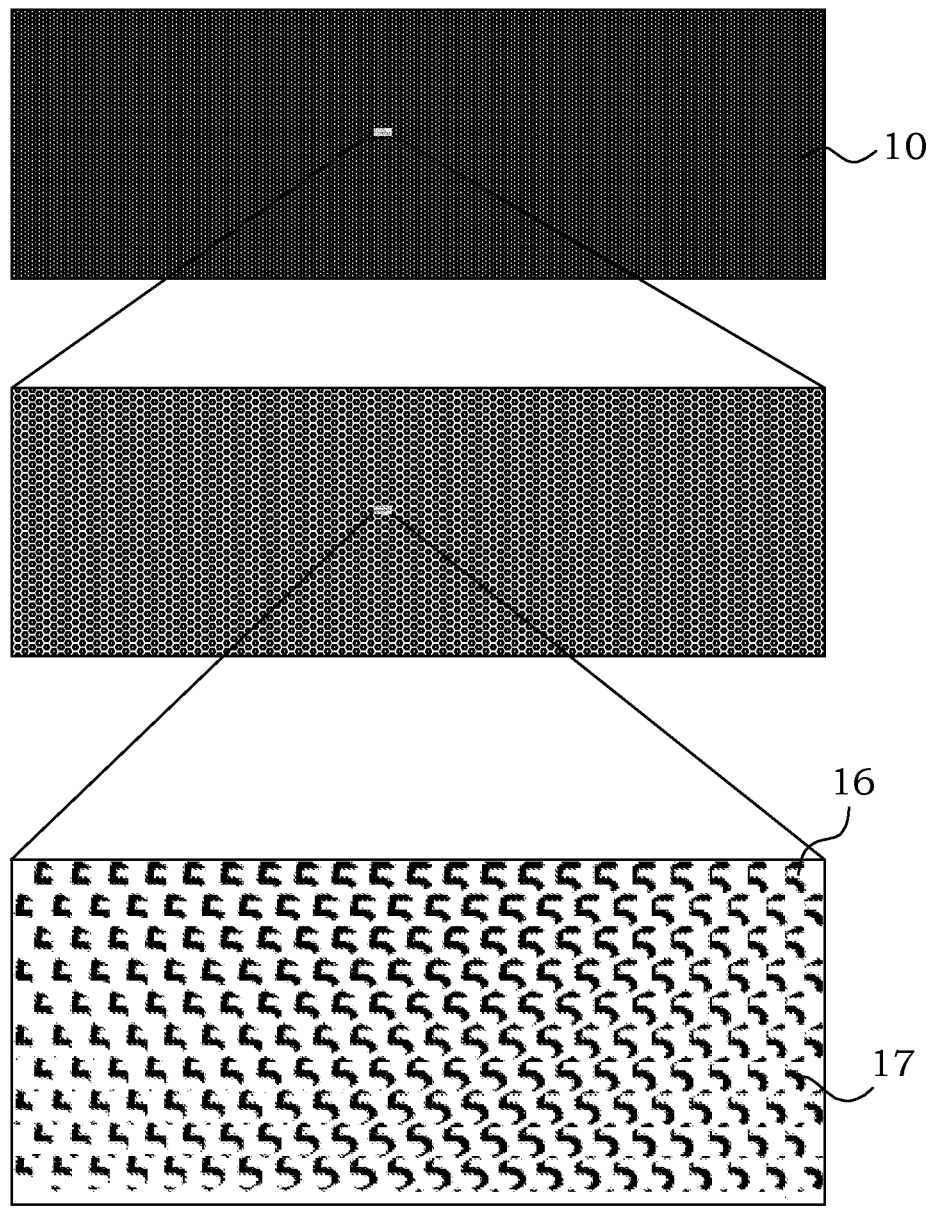
FIG. 5 illustrate another example of an integral synthetic-image device.

An example of a part of an image layer 10 of an integral synthetic-image device giving rise to an image of the figure "5" is illustrated in FIG. 5.

As long as the focusing area of the associated focusing element, i.e. the image point, is kept within the image cell 16 a synthetic image similar to a moiré image will be produced. However, when the focusing area of the associated focusing element enters into a neighbouring cell 16, the synthetic image will suddenly disappear and will instead appear at another position; a flip in the synthetic image occurs.

The ideas of having image cells with different image objects can be driven further. The moiré synthetic images can be given an apparent depth, but is in principle restricted to one depth only. A true three-dimensional appearance is difficult to achieve with moiré synthetic images. However, when considering integral synthetic images, the freedom of changing the image objects from one image cell to another can also be used e.g. to provide a more realistic three-dimensionality of the produced images.

Figure 6:
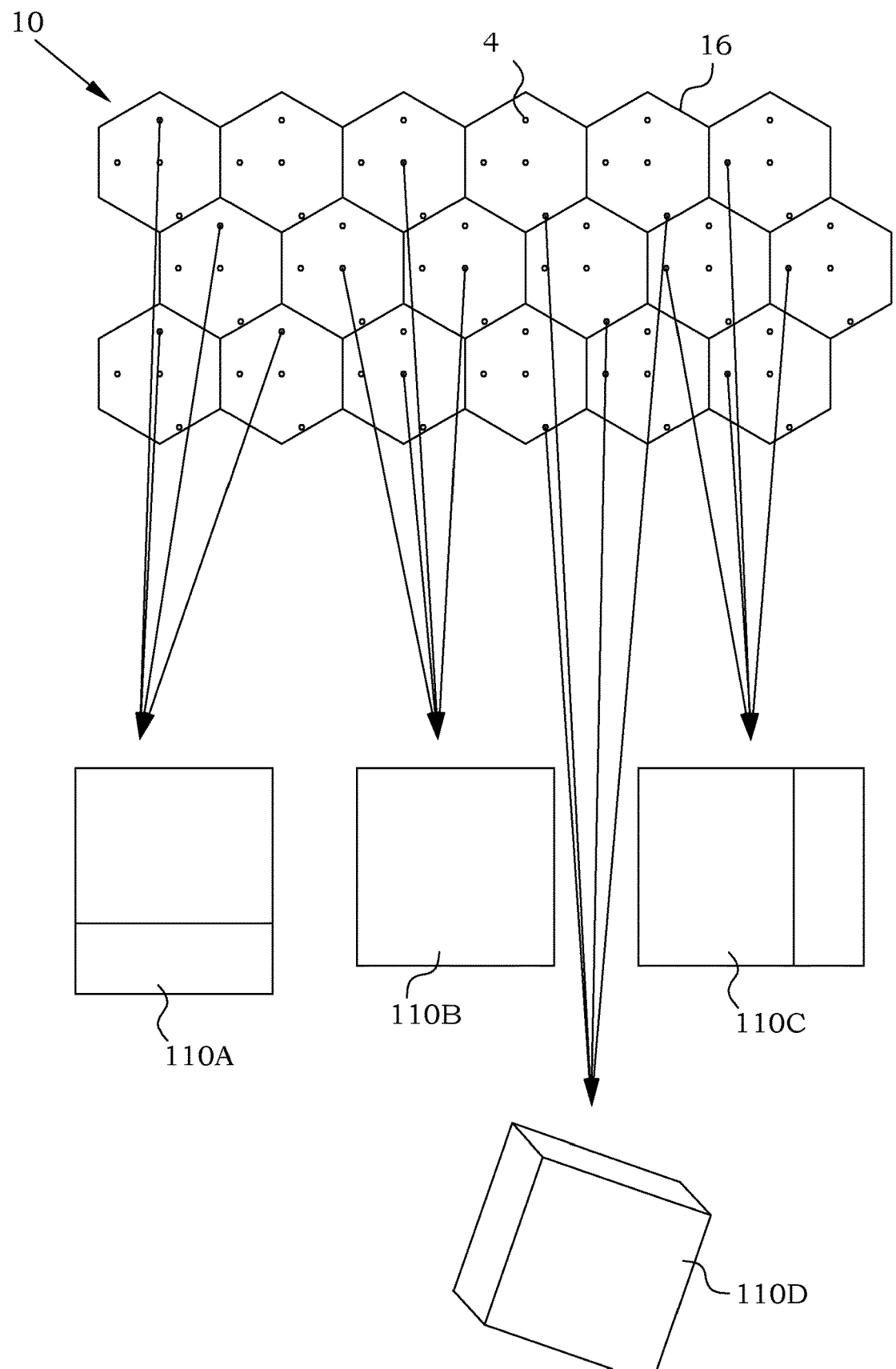
FIG. 6 illustrates an example of how a three-dimensional image can be created.

In FIG. 6, image cells 16 of an image layer 10 are illustrated. Four different image points 4 for each image cell 16, corresponding to focusing areas of associated focusing elements when viewed in four different directions are illustrated. Image objects of the centre image point 4 in each image cell corresponds to a viewing angle as achieved if the synthetic-image device is viewed in a perpendicular manner. Such image objects may then be designed such that they give rise to an integral synthetic image 110B as illustrated in the lower centre part of FIG. 6 showing a top surface of a box. Image objects of the uppermost image point 4 in each image cell corresponds to a viewing angle as achieved if the synthetic-image device is tilted away from the viewer. Such image objects may then be designed such that they give rise to an integral synthetic image 110A as illustrated in the lower left part of FIG. 6, showing the top surface and a front surface of a box. Image objects of the leftmost image point 4 in each image cell corresponds to a viewing angle as achieved if the synthetic-image device is tilted to the left with reference to the viewer. Such image objects may then be designed such that they give rise to an integral synthetic image 110C as illustrated in the lower right part of FIG. 6, showing the top surface and a side surface of a box. Image objects of the image point 4 in the lower right part in each image cell corresponds to a viewing angle as achieved if the synthetic-image device is tilted towards and to the right with reference to the viewer. Such image objects may then be designed such that they give rise to an integral synthetic image 110D as illustrated at the very bottom of FIG. 6, showing the top surface, a side surface and a back surface of a box. Together, these integral synthetic images 110A-D and further integral synthetic images emanating from other image points of the cells give an impression of a rotating box in a three-dimensional fashion. This change of the synthetic image thus follows expected parallax rules. The so achieved image properties are in such cases simulations of "real" optical properties, e.g. a true three-dimensional image with parallax changes.

In a similar fashion, by modifying the image content in each image cell separately, different kinds of optical phenomena can be achieved. By adapting each part of the image cell according to the requested image appearance in a corresponding viewing direction, the integral synthetic image can be caused to have almost any appearances. The so achieved image properties can therefore be designed to show optical effects which are not present in "real" systems, i.e. having non-parallax features. This is the type of synthetic image devices that is the object of the present technology.

A simple effect is to switch between different synthetic images for different angle sectors. This was illustrated e.g. in the published international patent application WO 94/27254 A1. In such cases, expressed in terms of an integral image, the image layer is provided with more than one image cell associated with a single focussing element. Within each of these image cells, image objects are provided, which gives rise to a particular synthetic image. Since the area of each image cell is limited, the angular directions within which the synthetic image is visible are also limited. Another typical example of such an arrangement can be found in FIG. 47 of the U.S. Pat. No. 7,738,175 B2. Here, a number of image cells are provided, divided in an azimuthal direction into sectors. This means that the different synthetic images are viewable in restricted azimuthal viewing directions.

In an alternative denotation, all the image objects may be considered to be contained in one common image cell, however, divided in different image cell portions, one for each synthetic image.

When passing the viewing angles associated with a border between two image cell portions, there will be a flip between the two synthetic images seen. If the differences between the separate synthetic images are small between consecutive neighbouring image cell portions, a successive change in image appearance can be obtained. In other words, an animation can be produced. Such a gradual change can be of different kinds, such as, but not limited to, shape, size, orientation, position, colour, or a combination of several of these parameters.

This can be schematically illustrated by the following figures. In FIG. 7A, a similar set-up as in FIG. 3A is shown. However, in this case the synthetic image device 1 is not a moiré device since the content of the different image cells will differ. The image layer 10 is divided in image cells 16 in an array 7 of image cells. Each image cell 16 is associated with a focusing element 22. In order to produce the "K" image, only the parts of the image objects within the image points 4 are necessary, thereby forming truncated image objects 17. Regardless of what is present outside these image points 4, a large synthetic image 100 of a "K" will anyway be seen when the device is viewed from the top, however, in this case an integral image 106, since it is based on non-repetitive truncated image objects 17.

Figure 7B:
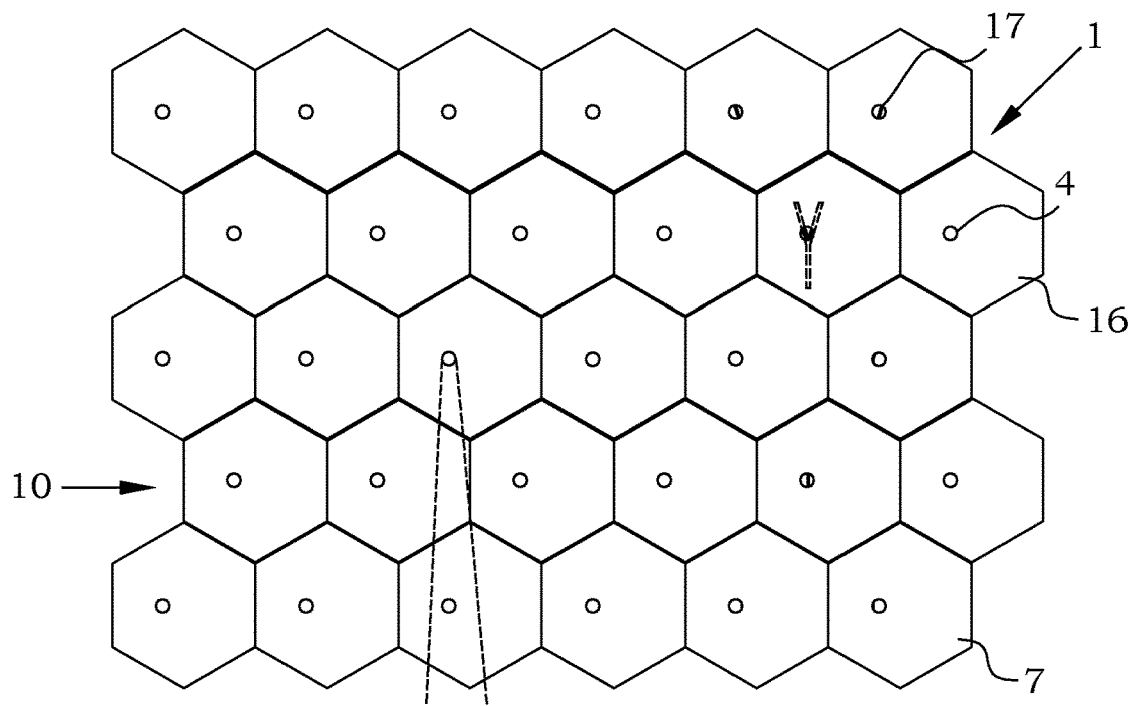
Figure 7B:
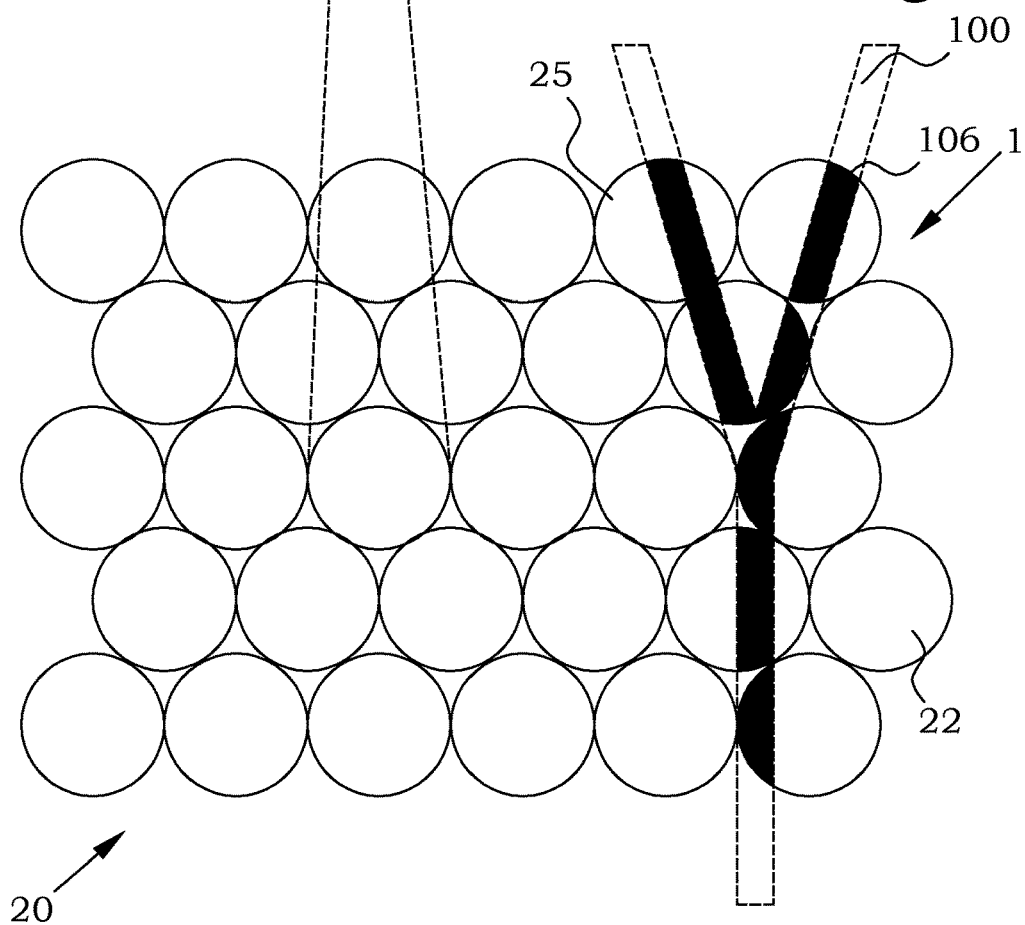

In FIG. 7B, the viewing angle is changed and consequently, the image point 4 is shifted within the image cell 16. In this case, the content of the truncated image objects 17 in this position is changed in order to give rise to the letter "Y" instead. If the intermediate image points between the ones giving the synthetic image in these two figures are designed to form intermediate designs between a letter "K" and a letter "Y", an animation of a gradual changing of the letter K into the letter Y can be achieved.

Figure 7C:
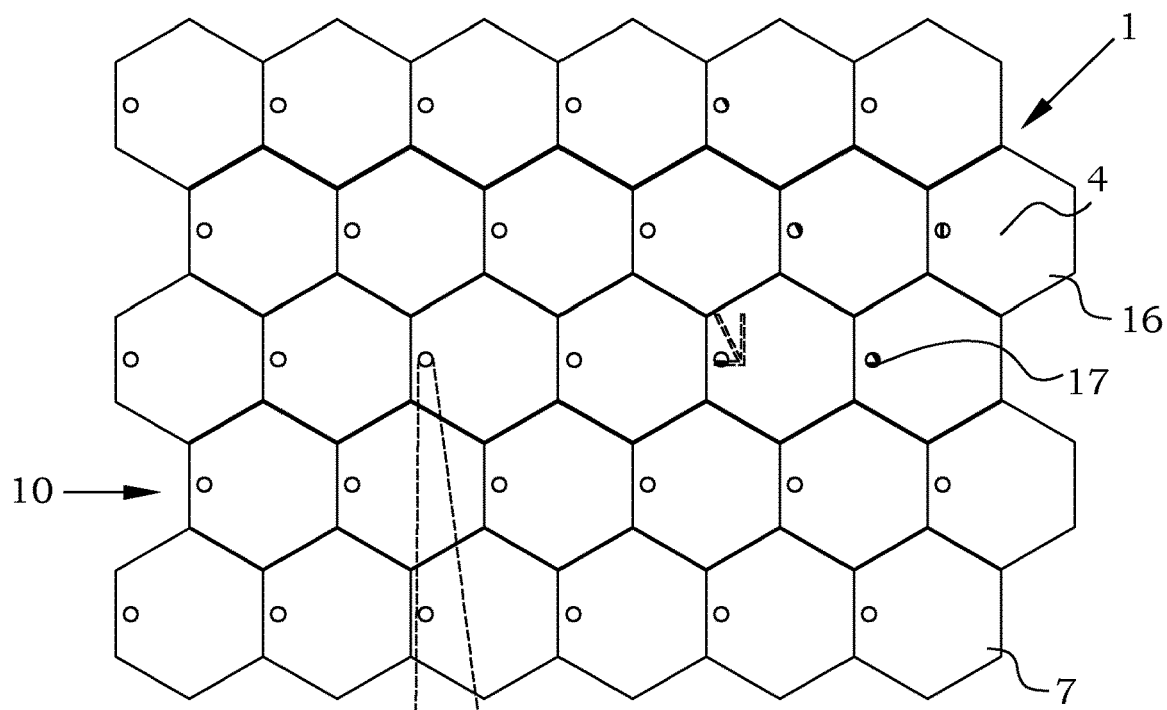
Figure 7C:
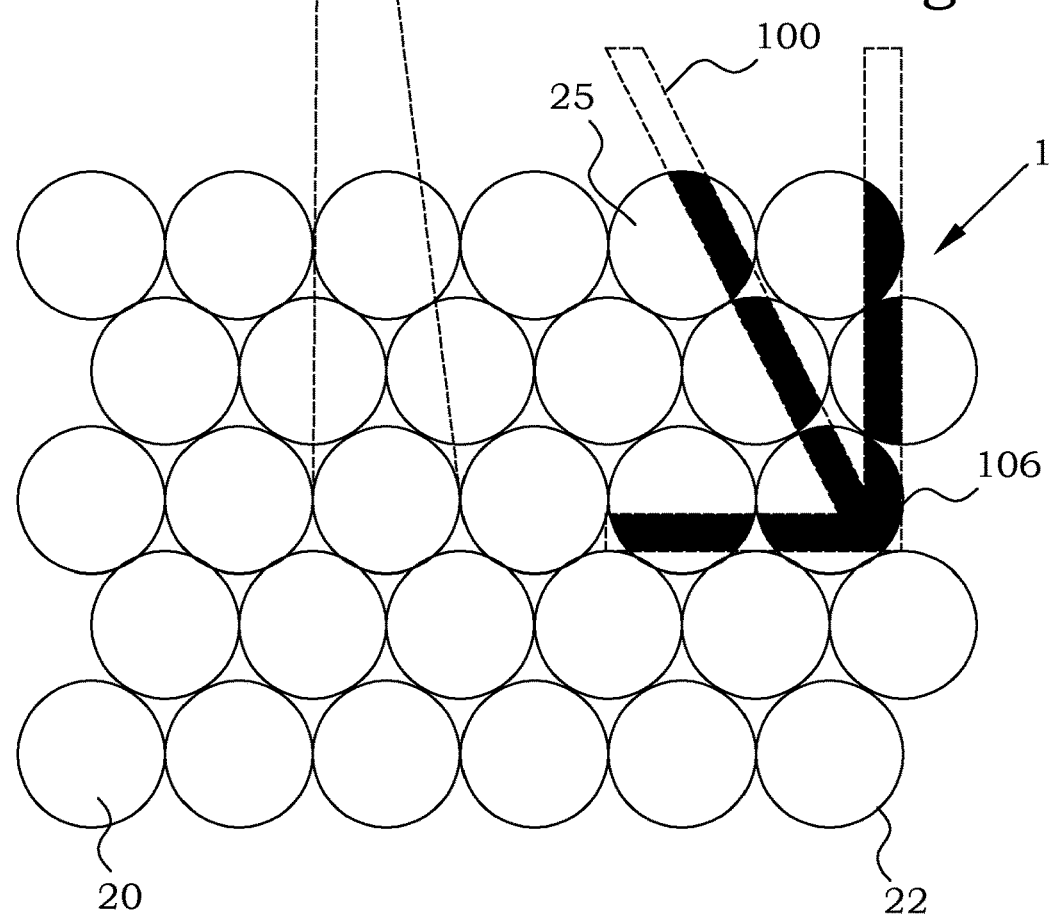

In FIG. 7C, yet another viewing angle is illustrated. In the image points 4 associated with this viewing angle, there are truncated image objects 17 giving rise to a heavily deformed "Y". Also here, only the image object features contained within the image point gives rise to the seen synthetic image 100.

In FIG. 7D, the situations of FIGS. 7A-C are compiled into one illustration. Within the marked image points 4, there are image information sufficient to provide the "K", "Y" and "distorted Y" in the three different directions, as schematically illustrated at the bottom of the figure. The remaining parts of the image layer 10, outside the marked image points 4, may now be provided with image objects giving rise to other synthetic images. For instance, if an animation is requested the areas of the image layer 10 between the marked image points 4 may be filled by image objects giving rise to synthetic images being somewhere between the "K", "Y" and "distorted Y".

In this manner, the entire image cell 16 can be filled with truncated image objects 17 that will give rise to different synthetic images 100 in different directions, possibly giving an animation effect, going beyond expected three-dimensional parallactic behaviour.

In order to make such an animation pleasant to view, the changes between consecutive synthetic images should be small, which means that a larger number of image objects giving synthetic images have to be provided within respective image cell portions within the image cell. Since the total available space for the image cell is limited, more steps between consecutive synthetic images leads to smaller individual image cell portions.

When manufacturing a synthetic image device, the image layer is typically provided by means of printing on or embossing in a polymer film also comprising or being attached to the focusing element array. When the image layer has been formed on the polymer film, it is almost impossible to adapt any structures in this image layer. This means that any structures intended to be included in the image layer of the final product, regardless of being a matter of basic image design or being advanced image effects or being appearance enhancing measures, has to be provided in the printing/embossing. This also means that the definition of the structures to be printed/embossed has to comprise also any appearance-enhancing modifications or advanced image effects of the originally designed synthetical image or synthetical image animation. The definition of the image layer to be provided can be illustrated by a digital image layer model comprising an array of digital image cells.

Figure 8A:
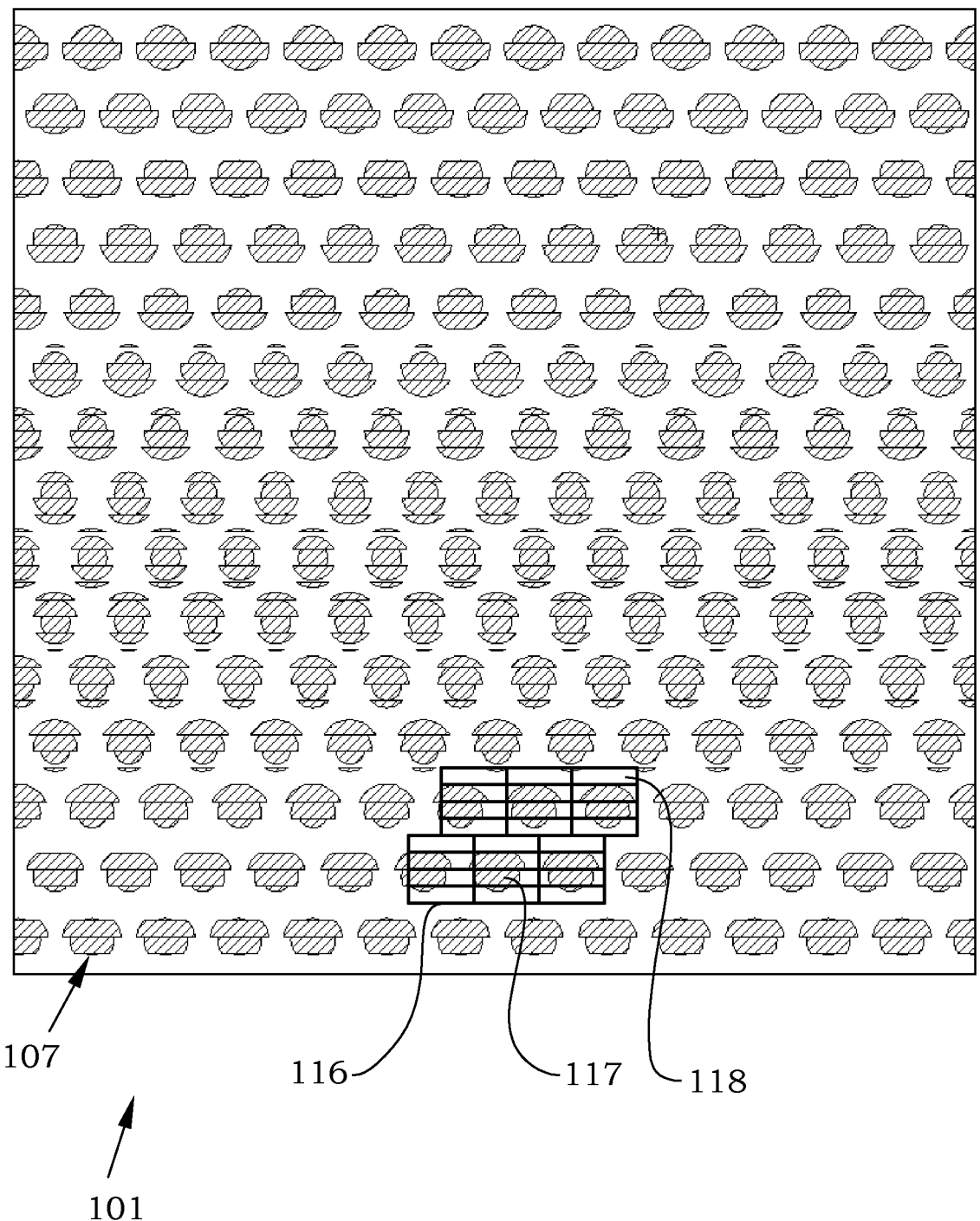
FIG. 8A illustrates a part of an embodiment of a digital image layer model for an animated synthetic image.

In FIG. 8A, a digital image layer model 101 of an example of a simple animation with 4 steps is illustrated. As the synthetic image device to be manufactures is tilted in the vertical direction, the synthetic images intended to be produced by the image objects are a circle whose size increase by a factor 2 and decrease again to the initial value. In a preferred embodiment, the number of steps is of course larger to achieve a smoother transition, but in order to show the principles in an illustrative manner, the number of steps is kept small. The digital image layer model 101 is furthermore illustrated in a very high magnification. Typical sizes of the distance between neighbouring focussing elements in the final product may be in the range of 15-150 microns, which means that the associated size of the digital images cells 116 should be the same.

The digital image layer model 101 comprises an array 107 of digital image cells 116, of which only a few are marked in the figure for viewability reasons. Each digital image cell 116 is divided in 4 digital image cell portions 118. In the present embodiment, the digital image cells portions 118 have the shape of horizontal bands or stripes. This digital image layer model 101 is built using a method similar to what is described by the published U.S. Pat. No. 8,739,711 B2. Within each digital image cells portion 118, digital truncated image objects 117 are provided. Since the intended synthetic image is to be an animation, the digital truncated image objects 117 in each digital image cells portion 118 are not in registry with each other. The variation of the digital truncated image objects 117 over the area of the illustrated part of the digital image layer model 101 is a feature connected to integral image devices.

Figure 8B:
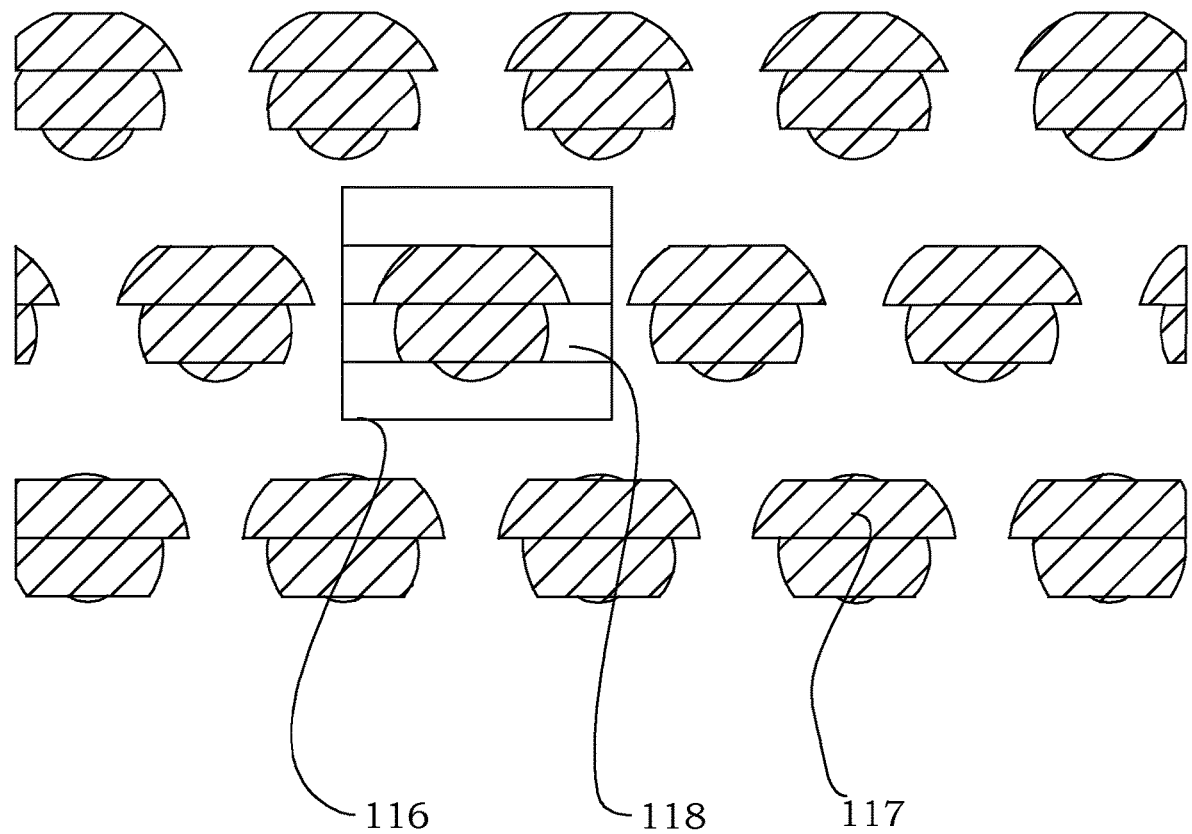
FIG. 8B illustrates an enlarged part of FIG. 8A.

FIG. 8B shows a close-up of some of the structures of the digital image layer model 101. It is here seen that at the borders between two consecutive digital image cell portions 118, there are sometimes very sharp structures of the truncated digital image objects 117, i.e. there are abrupt changes between truncated digital image objects 117 of one digital image cell portion 118 and truncated digital image objects 117 of another digital image cell portion 118. This abrupt change reduces the smoothness of the animation when the final synthetic image device is tilted in the vertical direction. Due to the small size, such sharp structures may also be difficult to reproduce in reality when the actual image layer is to be made as a "replica" of the digital image layer model 101. In the published U.S. Pat. No. 8,739,711 B2, it is mentioned that the image objects of the different stripes may overlap slightly or may be separated slightly. However, such arrangements typically give rise to strange or jumping optical effects at viewing angles associated with the borders.

It was found that a more attractive appearance will be achieved if the image objects, as a whole, are given a smoother shape. Instead of dividing the image structures in the image cell into narrow strips, the present ideas are directed in the opposite direction, i.e. having the final goal of creating a continuous image object possibly covering substantial parts of the image cell.

Figure 9:
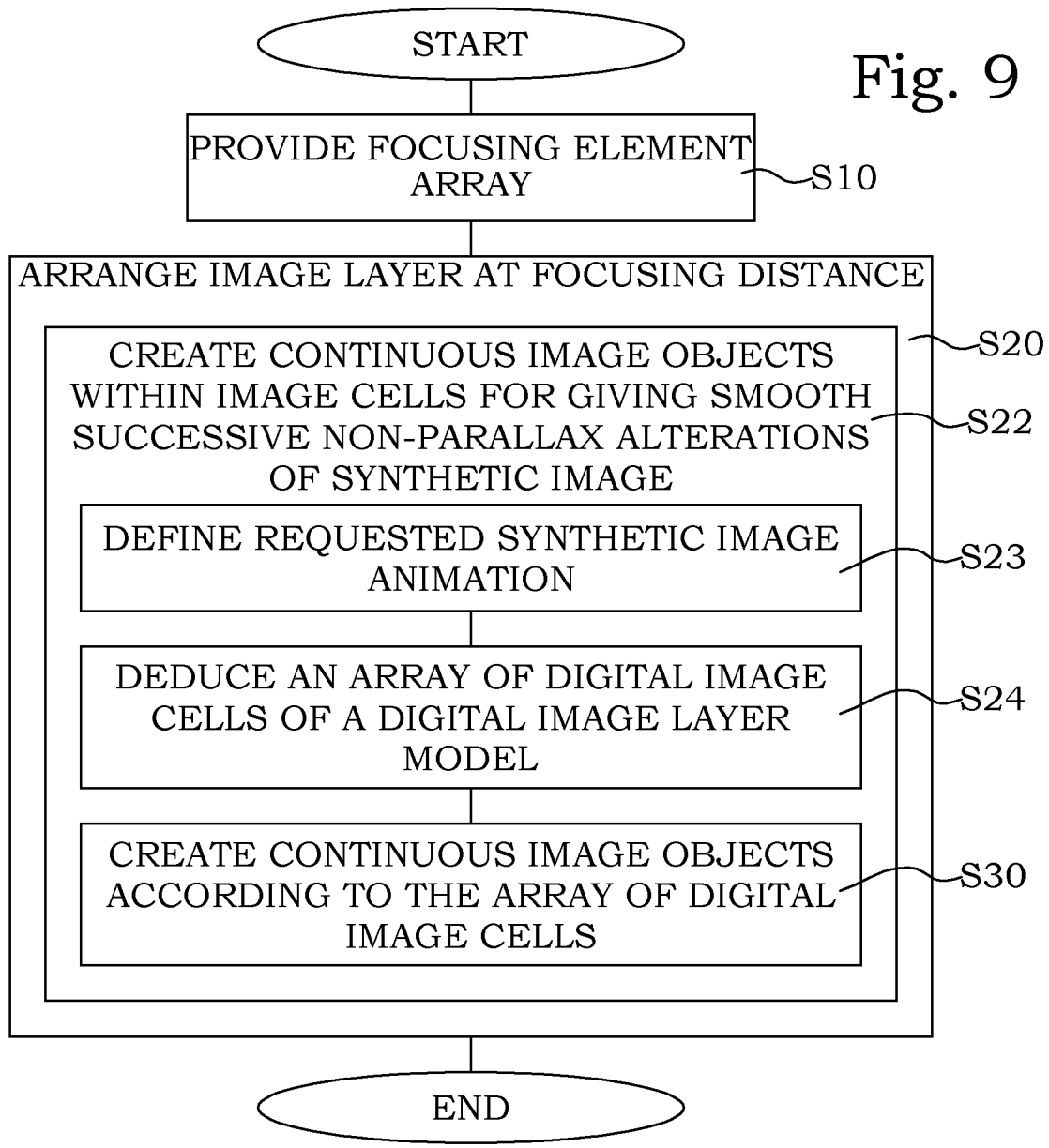
FIG. 9 is a flow diagram of steps of an embodiment of a method for manufacturing a synthetic image device.

In other words, an embodiment of a method for manufacturing a synthetic image device is illustrated in FIG. 9. In step S10, a focusing element array is provided. In step S20, an image layer is arranged in a vicinity of a focal distance of focusing elements of the focusing element array. Thereby a synthetic image composed of enlarged portions of the image layer becomes perceivable for a viewer. The image layer comprises an array of image cells, wherein each image cell is associated with a respective focusing element of the focusing element array. The focusing element array has a same symmetry and element distance as the focusing element array. Thereby, an image point at each position within an image cell cooperates with image points at corresponding positions within other image cells to give rise to a synthetic image in an associated viewing direction. The step S20 of arranging comprises the step S22, of creation of continuous image objects within the image cells such that synthetic images to be viewed, all having contributions from one of the continuous image objects in at least one of the image cells, present smooth successive non-parallax alterations upon changing a viewing direction.

The above method thus produces a synthetic image device. The synthetic image device a focusing element array and an image layer. The image layer is arranged in a vicinity of a focal distance of focusing elements of the focusing element array, whereby a synthetic image composed of enlarged portions of the image layer becomes perceivable for a viewer. The image layer comprises an array of image cells, wherein each image cell is associated with a respective focusing element of the focusing element array and wherein the focusing element array has a same symmetry and element distance as the focusing element array. Thereby, an image point at each position within an image cell cooperates with image points at corresponding positions within other image cells to give rise to an image in an associated viewing direction. The image cells comprise continuous image objects, wherein the continuous image objects are arranged such that synthetic images to be viewed, all having contributions from one of the continuous image objects in at least one of the image cells, present smooth successive non-parallax alterations upon changing a viewing direction.

Since it is very difficult to modify an image layer once it is printed or embossed, any definition of a requested synthetic image animation and possible modification thereof, as mentioned earlier and as will be discussed further below, is preferably performed before the actual image objects are formed. In other words, in one preferred embodiment, in a step S23, a requested synthetic image animation to be produced by the synthetic image device is designed and defined. The definition of the requested synthetic image animation is typically made by use of mathematical geometry definitions and has typically a viewing angle dependency. In a step S24, an array of digital image cells of a digital image layer model is deduced, wherein each of the digital image cells comprises a digital representation of a shape of the digital image cell and digital descriptions of digital image objects within the respective digital image cell. The digital descriptions of digital image objects are deduced from the definition of the requested synthetic image animation as being transformed by the operation of the array of focusing elements. This transformation consists of a mapping of an angle dependency of a requested appearance of a surface of a focusing element into a position dependency of the requested appearance of a surface of a focusing element at the corresponding digital image cell.

In step S30, the continuous image objects are created according to the array of digital image cells of the digital image layer model. This step is typically performed according to processes, as such known in prior art. Typically, such processes may comprise manufacturing of embossing tools with structures defined according to the array of digital image cells of the digital image layer model and embossing of an image layer of the synthetic image device by that embossing tool. Alternatively, such processes may comprise manufacturing of printing tools with structures defined according to the array of digital image cells of the digital image layer model and printing of an image layer of the synthetic image device by that printing tool. Further alternatives may comprise control of a printer head, e.g. in a laser printer, based on the content of the array of digital image cells. All these processes of transferring an array of digital image cells, defined by mathematical or other digital means, into physical structures at an image layer at a synthetic image device are, as known by any person skilled in the art and not further discussed.

In other words, in one embodiment, the creation of continuous image objects in each image cell comprises embossing the continuous image objects in a polymer layer on, or printing the continuous image objects on, a polymer substrate presenting the focussing elements.

In one embodiment, the creation of continuous image objects in each image cell comprises forming a tool for the embossing or printing with recesses formed according to the continuous image objects to be created.

In one embodiment, the printing comprises controlling of a printer head to print the continuous image objects to be created.

The basic procedure thus starts with a definition of the requested synthetic image animation. This requested synthetic image animation is thus the design-related input to the manufacturing process. This design can be provided by any external or internal process and is thus the goal of the synthetic images produced by the synthetic image device. Once this design is set, a number of process steps are performed, which are not related to design of the image, but instead to issues necessary for providing a synthetic image that is as clear and easy-to-view as possible. The first of these steps is the mathematical or digital transformation of a synthetic image animation into a digital definition of image structures giving rise to the requested synthetic image animation, as the array of digital image cells of the digital image layer model. When the array of digital image cells of the digital image layer model is defined, the physical image layer is created according to this digital image layer model. The entire transforming and possible adaptations of the image structures are thus preferably performed in the digital regime before creating any physical corresponding structures.

One approach comprises a definition of the requested synthetic image animation in a digital manner, where the shape is expressed as a function of the viewing angle in the digital image model. The digital image model may thereby continuously change its appearance for different viewing directions. The digital image layer model can then in one embodiment be a mathematical focusing-element-array transform of the digital image model. Thereby, each position within the digital image objects is a part transform of a respective viewing angle of the smooth successive non-parallax alterations of the synthetic image.

In other words, the transform transforms the viewing-angle dependence of the digital image model to a position dependence within each digital image cell of the digital image layer model, thereby creating the requested continuous image objects.

Such a mathematical transformation may be possible to perform for simple designs of the requested synthetic image animation. However, for more complex images and animation sequences, the pure mathematical approach may be extremely complex and not practically implementable. In such cases, a somewhat different approach may be used for deducing the definition of the array of digital image cells of a digital image layer model. It has surprisingly been found that the smoothness of the image objects in many cases is more important for a pleasant perception of a synthetic image animation than the exactness of the requested shapes of the image objects. If a small adaption of the actual shape of the image object is made, which contributes to the formation of a smooth continuous image object, the imperfections in the perception of the synthetic image caused by these adaptations are in most cases smaller than the imperfections in the perception of the synthetic image caused by sharp structures at cell portion borders. In other words, in many cases, a more pleasant appearance of the synthetic image animation is obtained if a smoothening of the image object is performed, even if it interferes with the originally intended shape of the image object.

In practice, any such adaptation has to be performed in the digital image layer model before the actual creation of the real image layer, i.e. before step S30.

Figure 10:
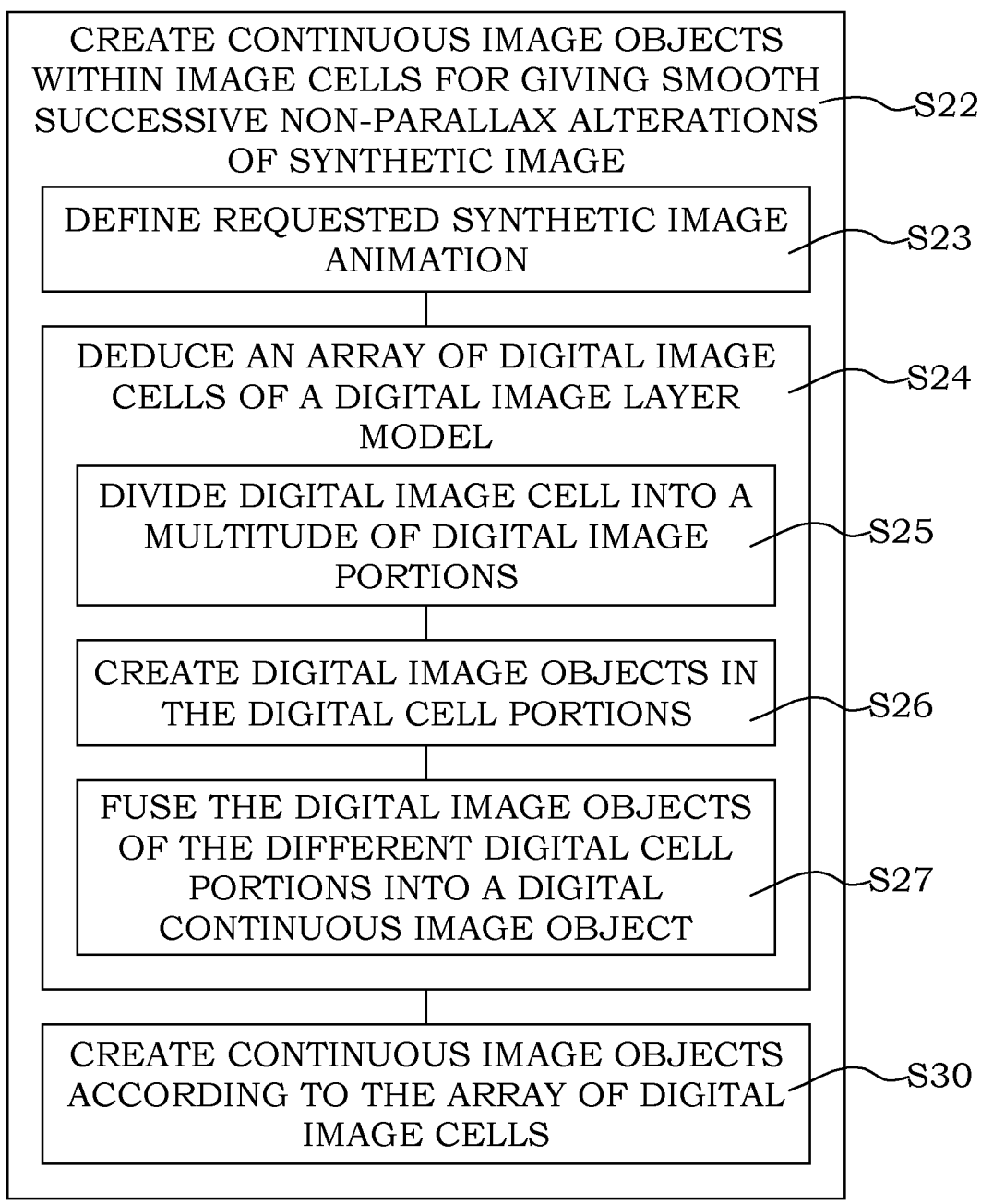
FIG. 10 is a flow diagram of part steps of an embodiment of step S22 in FIG. 9.

FIG. 10 illustrates one preferred embodiment of step S22 of creating continuous image objects. Step S24 of deducing an array of digital image cells of a digital image layer model comprises step S25, in which each digital image cell is divided into a multitude of digital image cell portions. In step S26, for the digital cell portions, digital image objects are created, which together with digital image objects of corresponding digital cell portions of other digital image cells, when transformed as they would have been viewed via an associated focussing element, give rise to a synthetic image corresponding to a digital image model, continuously changing its appearance for different viewing directions. This particular part step may have some similarities to the approach of some prior art.

However, opposite to any prior art approaches, the present approach aims for a continuous image object. To this end, in step S27, the digital image objects of each digital cell portion within each digital image cell are fused into a digital continuous image object of the digital image cell, whereby the digital continuous image objects extend over a plurality of digital cell portions. The creation of continuous image objects in the image layer in step S30 is then performed according to the digital continuous image object of the digital image cell.

This digital continuous image object is a smooth object without sharp structures induced by any digital cell portion division. The digital continuous image object has a boundary that in a mathematical description has a tangent direction that is derivable in all points, except for when the design of the synthetic image to be seen by the viewer comprises sharp edges. In other words, there are no sharp edges at the image object that are results of any cell portion division. The digital continuous image object is thus continuous in the aspect that the associated synthetic image animation occurs successively without any distinct transformation between individual steps.

In one embodiment, each digital cell portion is associated with a respective associated viewing direction.

Figure 11A:
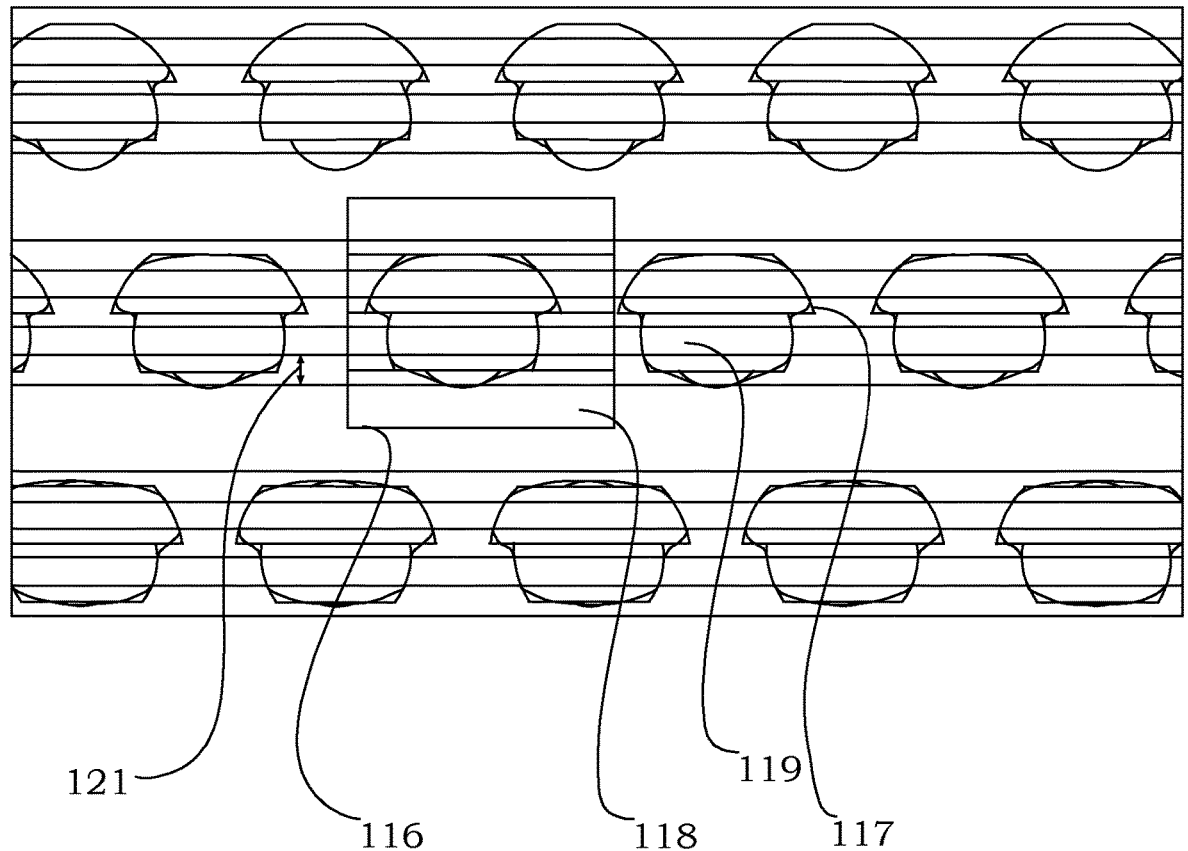
FIG. 11A illustrates schematically how an embodiment of creating a digital image layer model for an animated synthetic image operates.
Figure 11B:
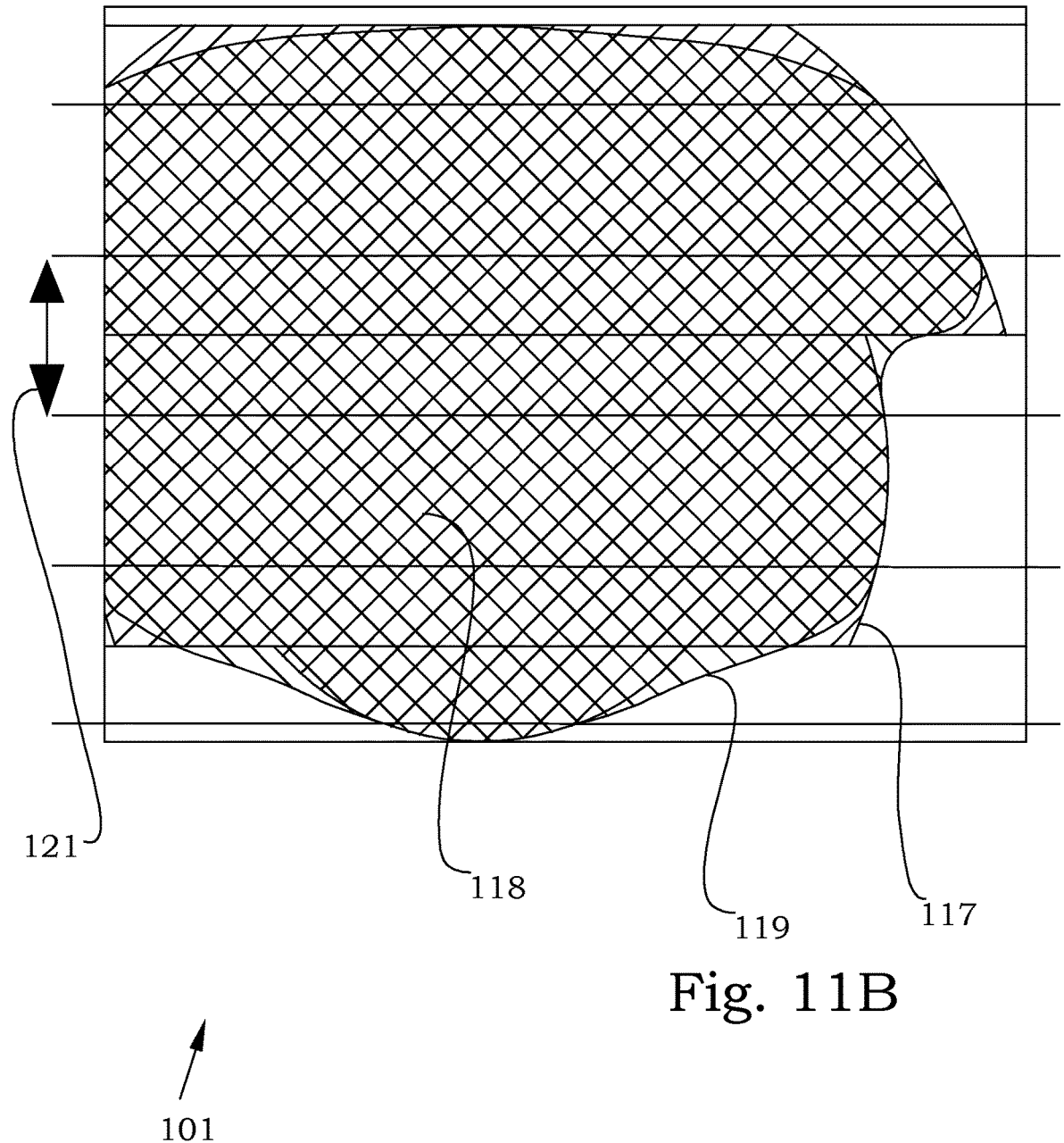
FIG. 11B illustrates an enlarged portion of a part of the digital image layer model of FIG. 11A.

If returning to the digital image layer models, one example of such an approach is illustrated by FIGS. 11A and 11B. In FIG. 11A, the full lines in connection with the image objects represent the digital truncated image object 117 of each digital cell portion 118, i.e. the digital image object precursors. Note the sharp edges that are present at many of the borders between the digital cell portions 118. A digital continuous image object 119 is marked with a hatching and extend over several digital image cell portions 118. The digital continuous image objects 119 are provided with shapes that are rounder than the ones provided by the digital truncated image objects 117. Once the digital continuous image objects 119 is provided, the digital image cell portion borders are irrelevant and can be omitted.

Figure 11C:
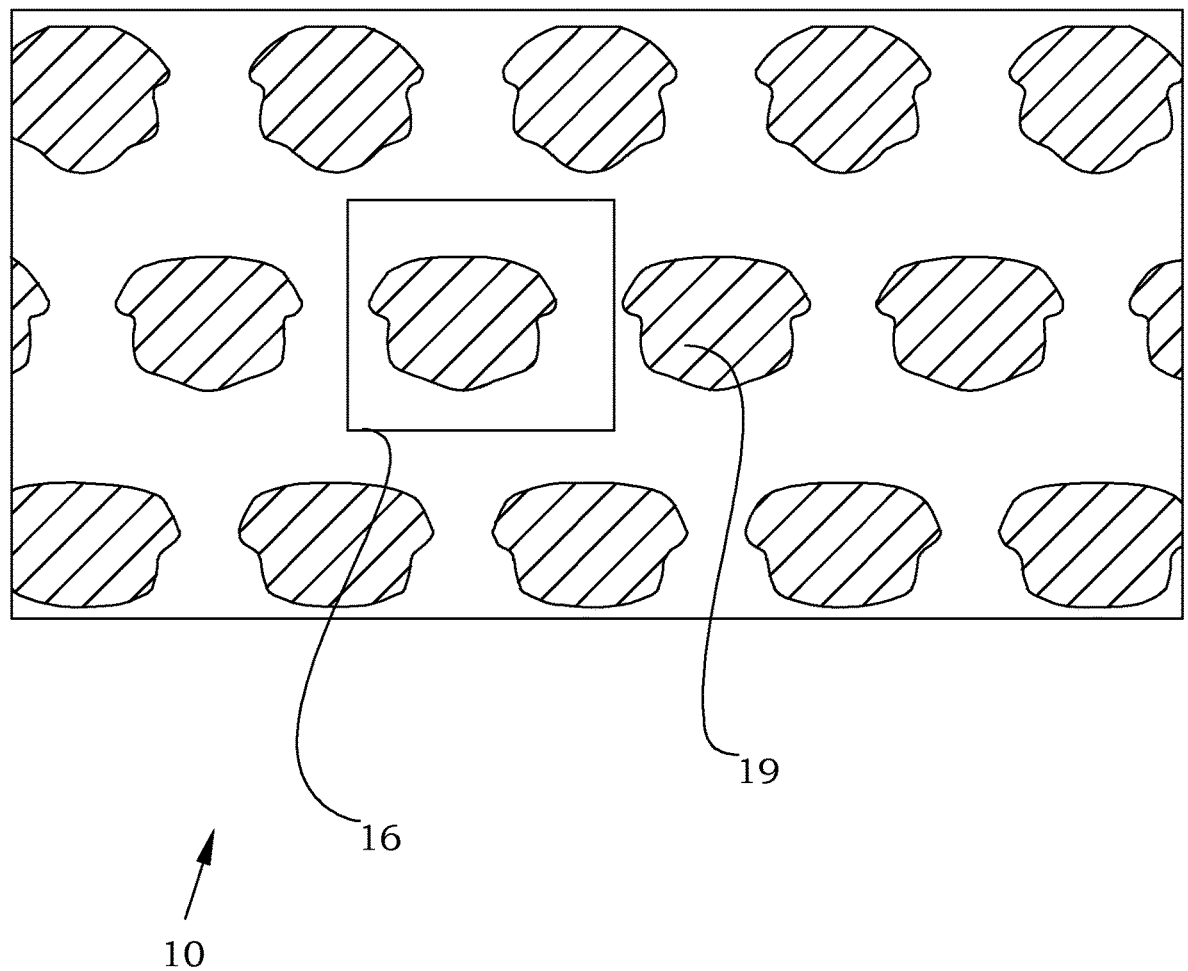
FIG. 11C illustrates a part of the resulting digital image layer model of FIG. 11A.

In one embodiment, an interpolation of the precursors, i.e. the digital truncated image object 117 in an interpolation zone 121 close to the border between neighbouring digital image cell portions 118 is performed. The method for the interpolation can for example be a spline approximation of the vertices present in the interpolation zone 121. Other mathematical methods for approximation or interpolation can of course be used. A close-up view of FIG. 11A is illustrated in FIG. 11B. This is the digital model that is to be transferred into a physical image layer. The resulting digital continuous image objects 119 of the digital image cells 116 of the digital image layer model 101 are in other words used for controlling the creation of the actual physical image layer. An enlarged portion of such an image layer 10 is illustrated in FIG. 11C. The image cells 16, of which one is marked in the figure, comprises continuous image objects 19. Thus, in the physical image layer 10, there are no image cell portion and there are no truncated image objects.

Returning e.g. to FIG. 11B, the width of the interpolation zone 121 is one parameter that may be used for optimizing the shape of the digital continuous image objects 119. A very narrow interpolation zone 121 will typically result in digital continuous image objects 119 with relatively abrupt curvatures. A very broad interpolation zone 121 may instead lead to large alterations of the main shape of the digital continuous image objects 119. The choice of interpolation zone 121 width is therefore preferably selected depending on the actual design of the requested synthetic image animation, i.e. how fast and how large differences in shape there are. A suitable interpolation zone 121 width can be selected, where there is a reasonable trade-off between abruptness and shape alterations in the digital continuous image objects 119. Since these alterations are performed digitally, it may even be possible to test different interpolation zone 121 widths, to be able to conclude which one gives the most promising result. In a typical case, the interpolation zone 121 width for truncated image objects placed edge to edge is selected in the range of 5%-60% of a width of a digital cell portion in the considered direction.

In other words, in one embodiment, the method for manufacturing a synthetic image device comprises removing, if two digital cell portions have a common edge and borders of a respective digital image object at the common edge, border portions of the respective digital image objects at the common edge that faces each other, thereby merging the digital image objects. The borders of the merged digital image objects are smoothened at least in a vicinity of the common edge, giving the digital continuous image objects extending over a plurality of digital cell portions.

Figure 12:
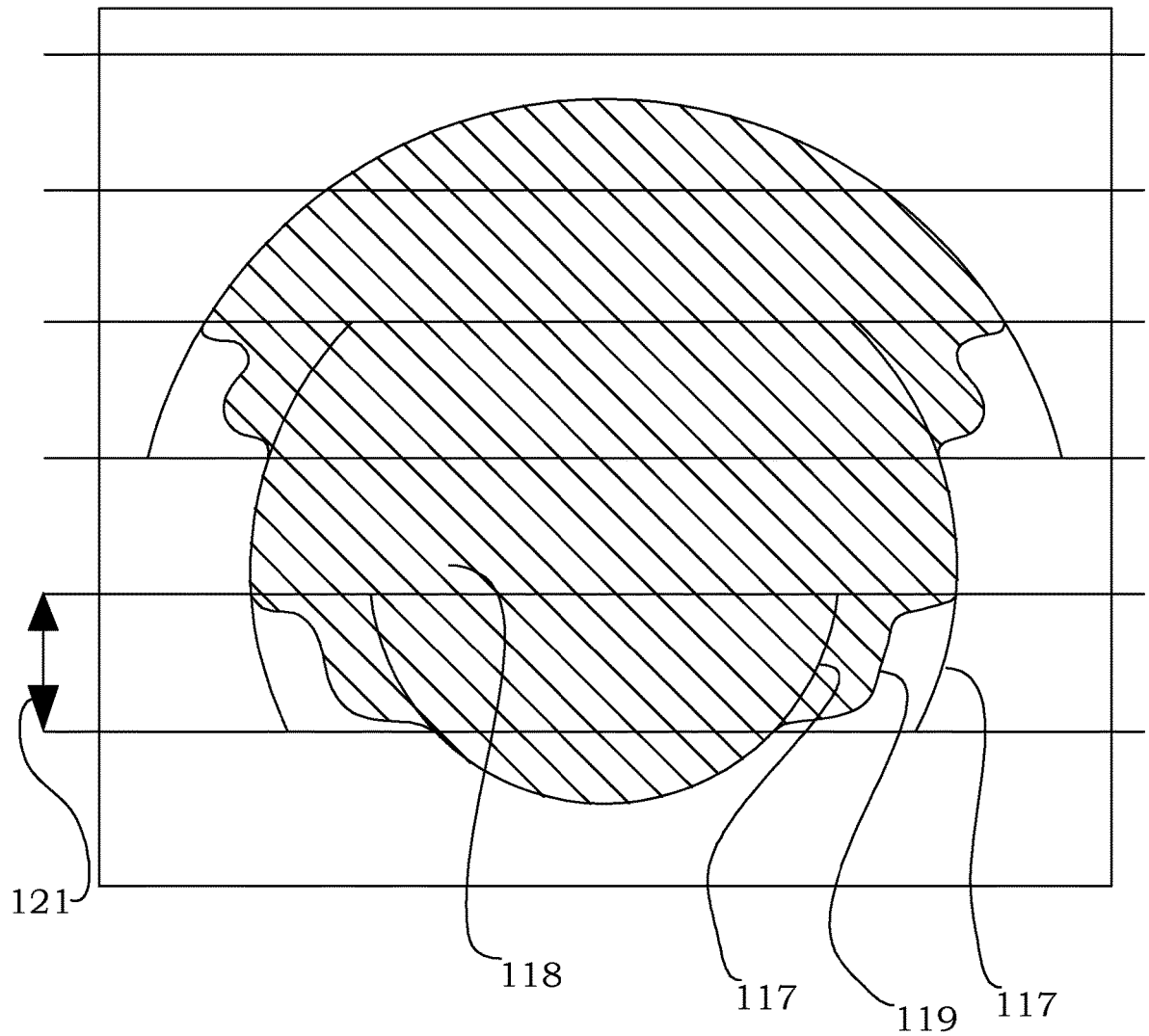
FIG. 12 illustrates schematically how another embodiment of creating a digital image layer model for an animated synthetic image operates.

Another example of an approach of merging digital truncated image objects 117 of different digital image cell portions 118 is illustrated by another close-up FIG. 12. Here, digital truncated image object 117 are provided in overlapping digital image cell portions 118. The full lines 117 represent the digital truncated image object 117 as formed in the different digital image cell portions 118. The digital continuous image object 119 is marked with a hatching and extend over several digital image cell portions 118. The digital continuous image object 119 is provided with rounded shapes being compromises between the overlapping parts the digital truncated image object 117. Once the digital continuous image object 119 is provided, the borders of the digital image cell portions 118 are of no relevance and can be omitted.

In one embodiment, an interpolation of the digital truncated image objects in an interpolation zone 121, at least enclosing the overlapping between neighbouring digital image cell portions 118, is performed. The method for the interpolation can for example be a spline approximation of the vertices from both digital truncated image object 117 present in the interpolation zone 121. Other mathematical methods for approximation or interpolation can of course be used.

In other words, in one embodiment, the method for manufacturing a synthetic image device comprises removing, if two digital cell portions overlap and have borders of a respective digital image object at an edge in the overlap, border portions of the respective digital image objects that overlap, thereby merging the digital image objects. Borders of the merged digital image objects are smoothened at least within an interpolation zone in a vicinity of the overlapping, giving the digital continuous image objects extending over a plurality of digital cell portions.

Figure 13:
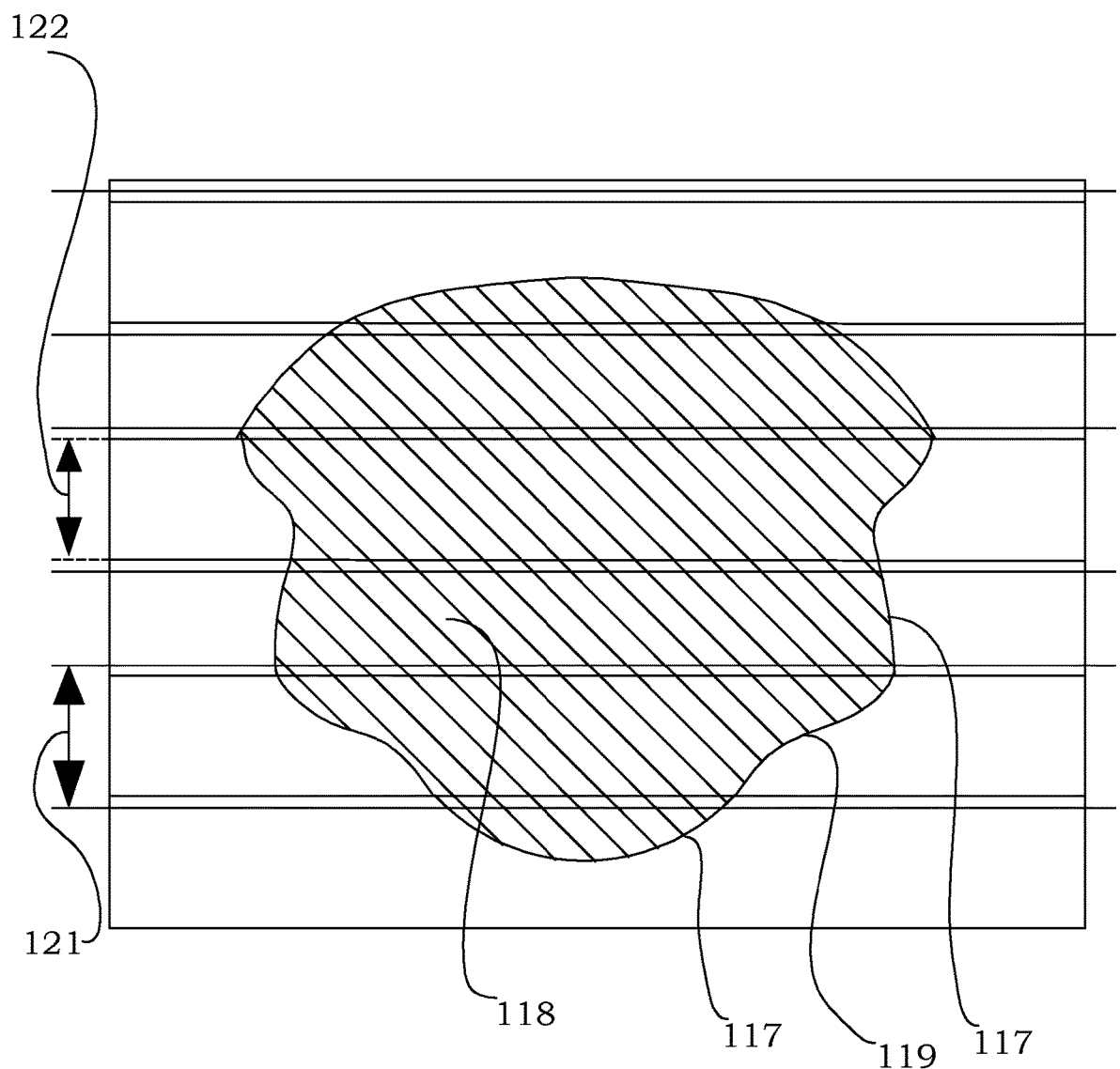
FIG. 13 illustrates schematically how yet another embodiment of creating a digital image layer model for an animated synthetic image operates.

Yet another example of an approach of merging digital truncated image objects 117 of different digital image cell portions 118 is illustrated by another close-up FIG. 13. Here, digital truncated image objects 117 are provided in digital image cell portions 118 that are separated from each other by a separation distance 122. Within this distance there is no information about any requested shapes. The full lines represent the digital truncated image objects 117 as formed in the different digital image cell portions 18. The separated digital truncated image objects 117 are connected to each other, forming a digital continuous image object 119. The digital continuous image objects 119 is marked with a hatching and extend over several digital image cell portions 118. The digital continuous image object 119 is provided with rounded shapes adapting the edges of the digital truncated image object 117 to each other. Once the digital continuous image objects 119 is provided, the digital image cell portion borders are of no relevance and can be omitted.

In one embodiment, an interpolation of the digital truncated image objects 117 in an interpolation zone 121 enclosing at least a part of the separated neighbouring digital image cell portions 118 is performed. The method for the interpolation can for example be a spline approximation of the vertices from both digital truncated image object 117 on each side of the separation distance 122. Preferably, also additional information e.g. on the slope of the digital image objects at these locations is used for the interpolation, or, as illustrated, the interpolation zone 121 may comprise also parts of the digital image cell portions 118. Other mathematical methods for approximation or interpolation can of course be used.

In other words, in one embodiment, the method for manufacturing a synthetic image device comprises removing, if two digital cell portions have separated edges facing each other and borders of a respective digital image object at the separated edges facing each other, border portions of the respective digital image objects at the separated edges facing each other and connecting the respective digital image objects at the separated edges facing each other, thereby merging the digital image objects. Borders of the merged digital image objects are smoothened at least within an interpolation zone in a vicinity of the separated edges facing each other, giving the digital continuous image objects extending over a plurality of digital cell portions.

It can be noted that a synthetic image device with an image layer manufactured according to any of the FIGS. 8A-B, 11A-C, 12 and 13 will give rise to essentially the same synthetic image animation. In other words, all these examples belong to a same design of a synthetic image animation.

However, the differences in details in the image objects will impart the animations different degrees of smoothness and pleasantness when viewing the animations. The adaptations of the digital image objects thereby have no relation to the design of the requested synthetic image animation, but are pure technical measures to obtain a better quality of the experienced animation.

As indicated above, one minor disadvantage of using a general integral image approach is that there may be a discontinuity when the viewing angle becomes large enough to pass a border of the image cell. This is relevant also for an animation. When the view angle reaches an image cell border and moves into a neighbouring image cell, discontinuities in the animation can be the result. However, this may be mitigated if the animation is of a kind that can be repetitive. In such a case, the start image and the end image are the same. By selecting the associated viewing angles so that the start angle is associated with a position in the image cell that is placed in the absolute vicinity of an image cell border and that the end angle is associated with a position in the image cell that is placed in the absolute vicinity of an opposite image cell border, a continuing animation over the image cell border can be obtained.

If the animation is short, it is of course possible to have a number of cycles of such an animation within a single image cell.

In other words, in one embodiment, the creation of continuous image objects in each image cell comprises creation of continuous image objects is repetitive in at least a first direction. A distance between neighbouring focusing elements in the first distance is equal to an integer times a repetition distance in the first direction of the continuous image objects.

Figure 14A:
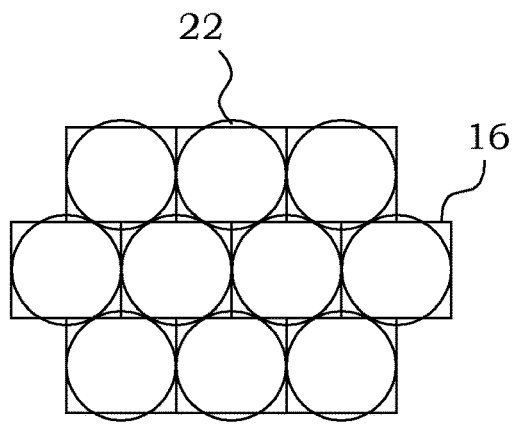
FIGS. 14A-D illustrate different embodiments of digital image cells.

In the above examples, the digital image cells are illustrated as rectangles. However, other geometries are also possible to use. FIG. 14A illustrates the rectangular case, where the image cells 16 cover the entire surface of the image layer. The focusing elements 22 are here assumed to have a circular shape and are also close-packed. The array of image cells 16 thereby has a same symmetry and element distance as the array of focusing elements 22, even if the shapes of the elements in the different arrays differ.

Figure 14B:
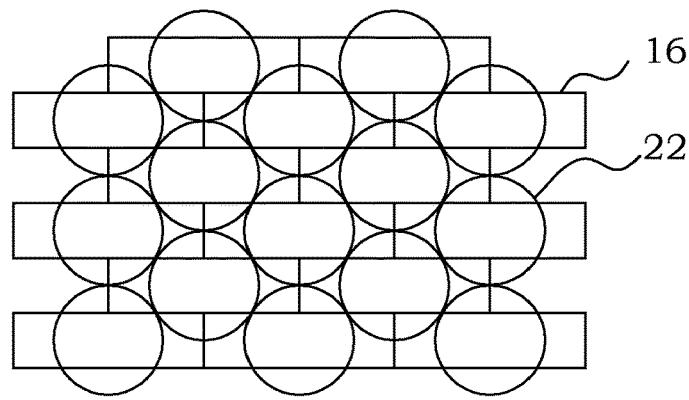

FIG. 14B illustrates another example, where the image cells 16 are in the shape of rectangles. Still, the arrays, as such, have a common symmetry and element distance. This means that corresponding points within the different image cells have a same relation to a respective focusing element 22.

Figure 14C:
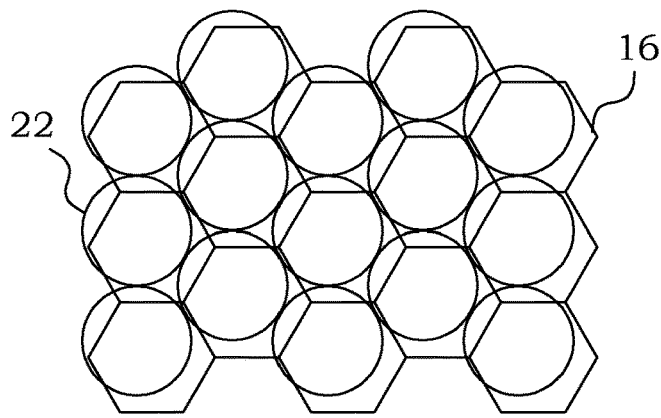

FIG. 14C is still another example. Here, the image cells 16 have a hexagonal shape and are not fully centred compared to the focusing elements 22. However, the property that corresponding points within the different image cells have a same relation to a respective focusing element 22 is still valid.

Figure 14D:
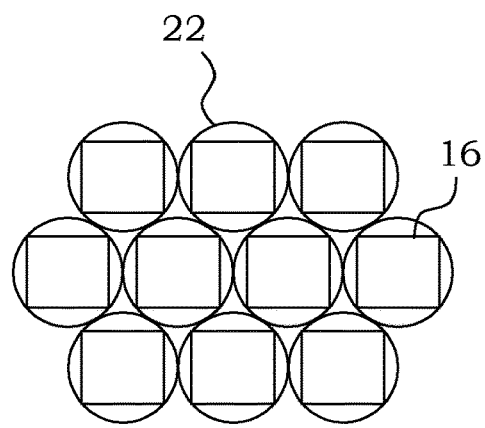

FIG. 14D illustrates an example where the image cells 16 are smaller than a maximum size. This means that in certain viewing angles, the synthetic image animation as provided by the image objects within the image cells 16 disappears. The area not covered by the image cells 16 may also be utilized for providing other synthetic images or synthetic image animations. In other words, there might be additional arrays of image cells used for creating other synthetic images provided side by side at the image layer together with the image cells 16 giving the above-discussed synthetic image animation.

Figure 15A:
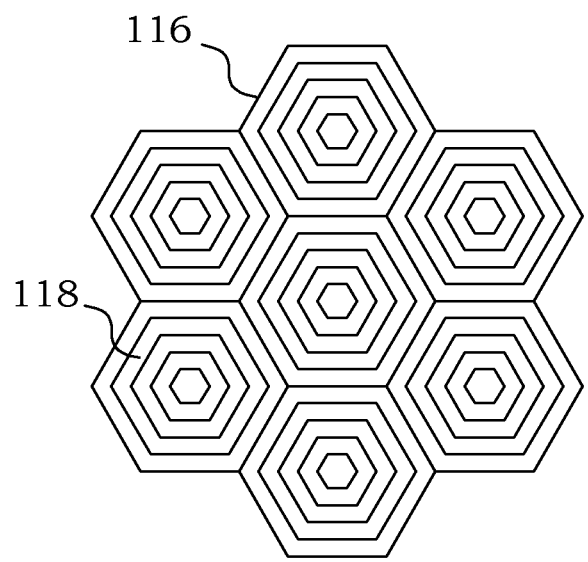
FIGS. 15A-C illustrate different embodiments of image cell portions.
Figure 15B:
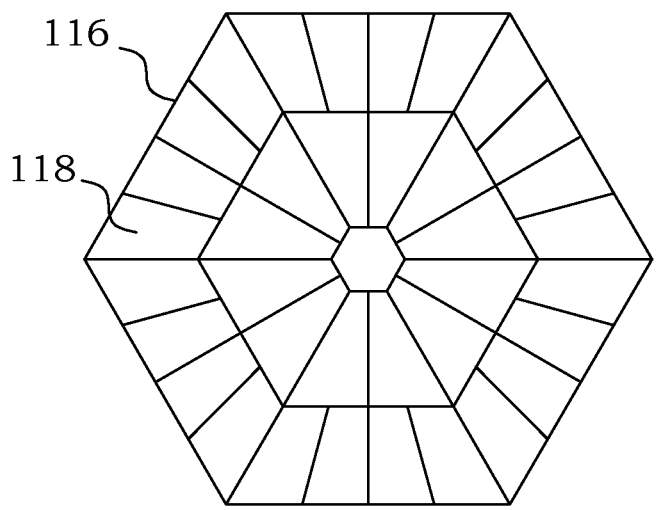
Figure 15C:
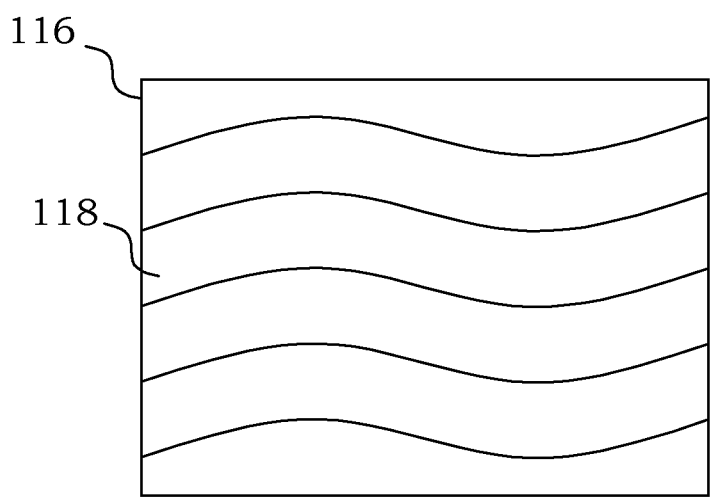

In the examples above, the digital image cell portions have been stripes with a rectangular shape. However, this is not a necessity, and a large variety of shapes and sizes of the digital image cell portions can be utilized. FIG. 15A illustrates 7 digital image cells 116 with a hexagonal symmetry, which are divided into digital image cell portions 118 being hexagonally shaped closed stripes. FIG. 15B illustrates a digital image cell 116 that is divided in digital image cell portions 118 of varying size and shapes. The division of one digital image cell 116 into digital image cell portions 118 in a digital image layer model may also differ from the division of another digital image cell 116 into digital image cell portions 118 in the same digital image layer model. This opens up for treating the adaptations of the different digital image cells 116 in different ways, e.g. depending on the complexity of the structures in that specific cell. The digital image cell portions 118 do not necessarily have straight edges, as e.g. illustrated in FIG. 15C.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for manufacturing a synthetic image device, comprising the steps of:
provinding a focusing element array; and
arranging an image layer in a vicinity of a focal distance of focusing elements of said focusing element array, whereby a synthetic image composed of enlarged portions of said image layer becomes perceivable for a viewer,
wherein said image layer comprises an array of image cells, wherein each image cell is associated with a respective focusing element of said focusing element array and wherein said array of image cells having a same symmetry and element distance as said focusing element array,
wherein said step of arranging comprises creating continuous image objects within said image cells such that synthetic images to be viewed, all having contributions from one of said continuous image objects in at least one of said image cells, present smooth successive non-parallax alterations upon changing a viewing direction,
wherein said creating continuous image objects is performed according to an array of digital image cells of a digital image layer model, wherein each said digital image cell comprises a digital representation of a shape of said digital image cell and digital descriptions of digital image objects within respective said digital image cell,
wherein said creating continuous image objects comprises the part steps of:
defining a requested synthetic image animation; and
deducing said array of digital image cells of a digital image layer model,
wherein said deducing of said creating continuous image objects in turn comprises the steps of:
dividing each digital image cell into a multitude of digital image cell portions;
creating, for the digital cell portions, digital image objects, which together with digital image objects of corresponding digital cell portions of other digital image cells, when transformed as they would have been viewed via an associated focussing element, give rise to a synthetic image corresponding to a digital image model, continuously changing an appearance thereof for different viewing directions; and
fusing said digital image objects of each digital cell portion within each digital image cell into a digital continuous image object of said digital image cell, whereby said digital continuous image objects extend over a plurality of digital cell portions, and
wherein said creating continuous image objects in said image layer is performed according to said digital continuous image object of said digital image cell.

2. The method according to claim 1, wherein each digital cell portion is associated with a respective associated viewing direction.

3. The method according to claim 1, wherein said step of fusing comprises the steps of:
removing, if two digital cell portions have a common edge and borders of a respective digital image object at said common edge, border portions of said respective digital image objects at said common edge that faces each other, thereby merging said digital image objects; and
smoothing borders of said merged digital image objects at least within an interpolation zone in a vicinity of said common edge, giving said digital continuous image objects extending over a plurality of digital cell portions.

4. The method according to claim 1, wherein said step of fusing comprises the steps of:
removing, if two digital cell portions overlap and have borders of a respective digital image object at an edge in said overlap, border portions of said respective digital image objects that overlap, thereby merging said digital image objects; and
smoothing borders of said merged digital image objects at least within an interpolation zone in a vicinity of said overlapping, giving said digital continuous image objects extending over a plurality of digital cell portions.

5. The method according to claim 1, wherein said step of fusing comprises the steps of:
removing, if two digital cell portions have separated edges facing each other and borders of a respective digital image object at said separated edges facing each other, border portions of said respective digital image objects at said separated edges facing each other and connecting said respective digital image objects at said separated edges facing each other, thereby merging said digital image objects; and
smoothing borders of said merged digital image objects at least within an interpolation zone in a vicinity of said separated edges facing each other, giving said digital continuous image objects extending over a plurality of digital cell portions.

6. The method according to claim 1, wherein said creating continuous image objects in each said image cell comprises creating continuous image objects being repetitive in at least a first direction, wherein a distance between neighbouring focusing elements in said first distance is equal to an integer times a repetition distance in said first direction of said continuous image objects.

7. The method according to claim 1, wherein said creating continuous image objects in each said image cell comprises embossing said continuous image objects in a polymer layer on, or printing said continuous image objects on, a polymer substrate presenting said focussing elements.

8. The method according to claim 1, wherein said creating continuous image objects in each said image cell comprises forming a tool for said embossing or printing with recesses formed according to said continuous image objects to be created.

9. The method according to claim 1, wherein said printing comprises controlling of a printer head to print said continuous image objects to be created.

10. The method according to claim 2, wherein said step of fusing comprises the steps of:
removing, if two digital cell portions have a common edge and borders of a respective digital image object at said common edge, border portions of said respective digital image objects at said common edge that faces each other, thereby merging said digital image objects; and smoothing borders of said merged digital image objects at least within an interpolation zone in a vicinity of said common edge, giving said digital continuous image objects extending over a plurality of digital cell portions.

11. The method according to claim 2, wherein said step of fusing comprises the steps of:

removing, if two digital cell portions overlap and have borders of a respective digital image object at an edge in said overlap, border portions of said respective digital image objects that overlap, thereby merging said digital image objects; and smoothing borders of said merged digital image objects at least within an interpolation zone in a vicinity of said overlapping, giving said digital continuous image objects extending over a plurality of digital cell portions.

12. The method according to claim 2, wherein said step of fusing comprises the steps of:

removing, if two digital cell portions have separated edges facing each other and borders of a respective digital image object at said separated edges facing each other, border portions of said respective digital image objects at said separated edges facing each other and connecting said respective digital image objects at said separated edges facing each other, thereby merging said digital image objects; and smoothing borders of said merged digital image objects at least within an interpolation zone in a vicinity of said separated edges facing each other, giving said digital continuous image objects extending over a plurality of digital cell portions.

13. The method according to claim 2, wherein said creating continuous image objects in each said image cell comprises creating continuous image objects being repetitive in at least a first direction, wherein a distance between neighbouring focusing elements in said first distance is equal to an integer times a repetition distance in said first direction of said continuous image objects.

14. The method according to claim 3, wherein said creating continuous image objects in each said image cell comprises creating continuous image objects being repetitive in at least a first direction, wherein a distance between neighbouring focusing elements in said first distance is equal to an integer times a repetition distance in said first direction of said continuous image objects.

15. The method according to claim 4, wherein said creating continuous image objects in each said image cell comprises creating continuous image objects being repetitive in at least a first direction, wherein a distance between neighbouring focusing elements in said first distance is equal to an integer times a repetition distance in said first direction of said continuous image objects.

16. The method according to claim 5, wherein said creating continuous image objects in each said image cell comprises creating continuous image objects being repetitive in at least a first direction, wherein a distance between neighbouring focusing elements in said first distance is equal to an integer times a repetition distance in said first direction of said continuous image objects.

17. The method according to claim 10, wherein said creating continuous image objects in each said image cell comprises creating continuous image objects being repetitive in at least a first direction, wherein a distance between neighbouring focusing elements in said first distance is equal to an integer times a repetition distance in said first direction of said continuous image objects.

18. The method according to claim 11, wherein said creating continuous image objects in each said image cell comprises creating continuous image objects being repetitive in at least a first direction, wherein a distance between neighbouring focusing elements in said first distance is equal to an integer times a repetition distance in said first direction of said continuous image objects.

19. The method according to claim 12, wherein said creating continuous image objects in each said image cell comprises creating continuous image objects being repetitive in at least a first direction, wherein a distance between neighbouring focusing elements in said first distance is equal to an integer times a repetition distance in said first direction of said continuous image objects.

20. The method according to claim 2, wherein said creating continuous image objects in each said image cell comprises embossing said continuous image objects in a polymer layer on, or printing said continuous image objects on, a polymer substrate presenting said focussing elements.

* * * * *